United States Patent
Kitazato

(10) Patent No.: US 10,609,428 B2
(45) Date of Patent: Mar. 31, 2020

(54) TRANSMISSION DEVICE AND TRANSMISSION METHOD AS WELL AS RECEPTION DEVICE AND RECEPTION METHOD

(71) Applicant: SONY CORPORATION, Tokyo (JP)

(72) Inventor: Naohisa Kitazato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/538,043

(22) PCT Filed: Oct. 6, 2015

(86) PCT No.: PCT/JP2015/078411
§ 371 (c)(1),
(2) Date: Jun. 20, 2017

(87) PCT Pub. No.: WO2016/113960
PCT Pub. Date: Jul. 21, 2016

(65) Prior Publication Data
US 2017/0347131 A1 Nov. 30, 2017

(30) Foreign Application Priority Data
Jan. 13, 2015 (JP) .................................. 2015-003813

(51) Int. Cl.
*H04N 21/235* (2011.01)
*H04N 21/236* (2011.01)
(Continued)

(52) U.S. Cl.
CPC .......... *H04N 21/235* (2013.01); *H04H 60/14* (2013.01); *H04N 21/236* (2013.01);
(Continued)

(58) Field of Classification Search
CPC .. H04N 21/235; H04N 21/236; H04N 21/238; H04N 21/438; H04N 21/4882; H04N 21/8166; H04H 60/14
See application file for complete search history.

(56) References Cited

U.S. PATENT DOCUMENTS 8,359,626 B1 * 1/2013 Rey ...................... H04N 21/235
725/132
2003/0217369 A1 * 11/2003 Heredia ............. H04N 21/2355
725/152
(Continued)

FOREIGN PATENT DOCUMENTS

EP 2 775 708 A1 9/2014
EP 2 800 392 A1 11/2014
(Continued)

OTHER PUBLICATIONS

Japanese Office Action dated Oct. 10, 2017 in Japanese Patent Application No. 2016-111234 (with English translation).
(Continued)

*Primary Examiner* — Pankaj Kumar
*Assistant Examiner* — Alexander Boyd
(74) *Attorney, Agent, or Firm* — Oblon, McClelland, Maier & Neustadt, L.L.P.

(57) ABSTRACT

Control information on a data broadcasting application for each delivery segment is distributed.
An application service descriptor for each delivery segment is arranged into an MP table stored in a PA message on the side of a broadcast station. Each application service descriptor indicates information on one application type and priority of the application type. A receiver further selects a specific MH-AIT and data transmission message, on the basis of the priority for each application type, indicated with the application service descriptor, and a default AIT flag.

19 Claims, 22 Drawing Sheets

(51) Int. Cl.
*H04N 21/238* (2011.01)
*H04N 21/438* (2011.01)
*H04H 60/14* (2008.01)
*H04N 21/488* (2011.01)
*H04N 21/81* (2011.01)

(52) U.S. Cl.
CPC ......... *H04N 21/238* (2013.01); *H04N 21/438* (2013.01); *H04N 21/4882* (2013.01); *H04N 21/8166* (2013.01)

(56) References Cited

U.S. PATENT DOCUMENTS

| | | | |
|---|---|---|---|
| 2004/0075551 A1* | 4/2004 | Marino | G08B 25/007 340/539.1 |
| 2007/0091919 A1* | 4/2007 | Sandoval | H04N 21/235 370/466 |
| 2010/0107181 A1 | 4/2010 | Kim et al. | |
| 2012/0039332 A1* | 2/2012 | Jackowski | H04L 47/2441 370/389 |
| 2014/0344877 A1 | 11/2014 | Ohmata et al. | |
| 2015/0020094 A1 | 1/2015 | Moon et al. | |
| 2015/0117213 A1* | 4/2015 | Pinheiro | H04W 28/0284 370/235 |
| 2016/0173919 A1* | 6/2016 | Iguchi | H04N 21/4622 725/116 |
| 2016/0330514 A1* | 11/2016 | Yoshizawa | H04N 21/4622 |
| 2017/0257663 A1* | 9/2017 | Aono | H04N 21/2362 |

FOREIGN PATENT DOCUMENTS

| | | |
|---|---|---|
| JP | 2013-9319 A | 1/2013 |
| JP | 2013-9336 A | 1/2013 |
| JP | 2013-98863 A | 5/2013 |
| JP | 2014-200054 A | 10/2014 |
| JP | 2014-211248 A | 11/2014 |
| JP | 2015-126464 A | 7/2015 |
| JP | 2016-92832 A | 5/2016 |
| WO | WO 2012/102133 A1 | 8/2012 |
| WO | 2013/080632 A1 | 6/2013 |
| WO | WO 2013/154023 A1 | 10/2013 |
| WO | WO 2014/147133 A1 | 9/2014 |

OTHER PUBLICATIONS

"MMT-Based Media Transport Scheme in Digital Broadcasting Systems", Association of Radio Industries and Businesses, ARIB STD-B60 1.0, Jul. 31, 2014, pp. 1-180 with cover pages.

Extended European Search Report dated Jul. 16, 2018 in corresponding European Patent Application No. 15877912.4 citing documents AA, AO, AX and AY therein, 8 pages.

DVB, "Digital Video Broadcasting (DVB); Signaling and Carriage of Interactive Applications and Services in Hybrid broadcast/broadband Environments", ETSI TS 102 809 V1.1.1, Technical Specification, XP14045075, (Jan. 2010), pp. 1-98.

ETSI, "Hybrid Broadcast Broadband TV", ETSI TS 102 796 V1.2.1, Technical Specification, XP14092699, (Nov. 2012), pp. 1-88.

Office Action dated Jul. 16. 2019 in corresponding Japanese Patent Application No. 2016-532016 (with English Translation), citing documents AA, AO-AV therein; 13 pages.

International Search Report dated Jan. 12, 2016 in PCT/JP2015/078411 filed Oct. 6, 2015.

* cited by examiner

FIG. 8
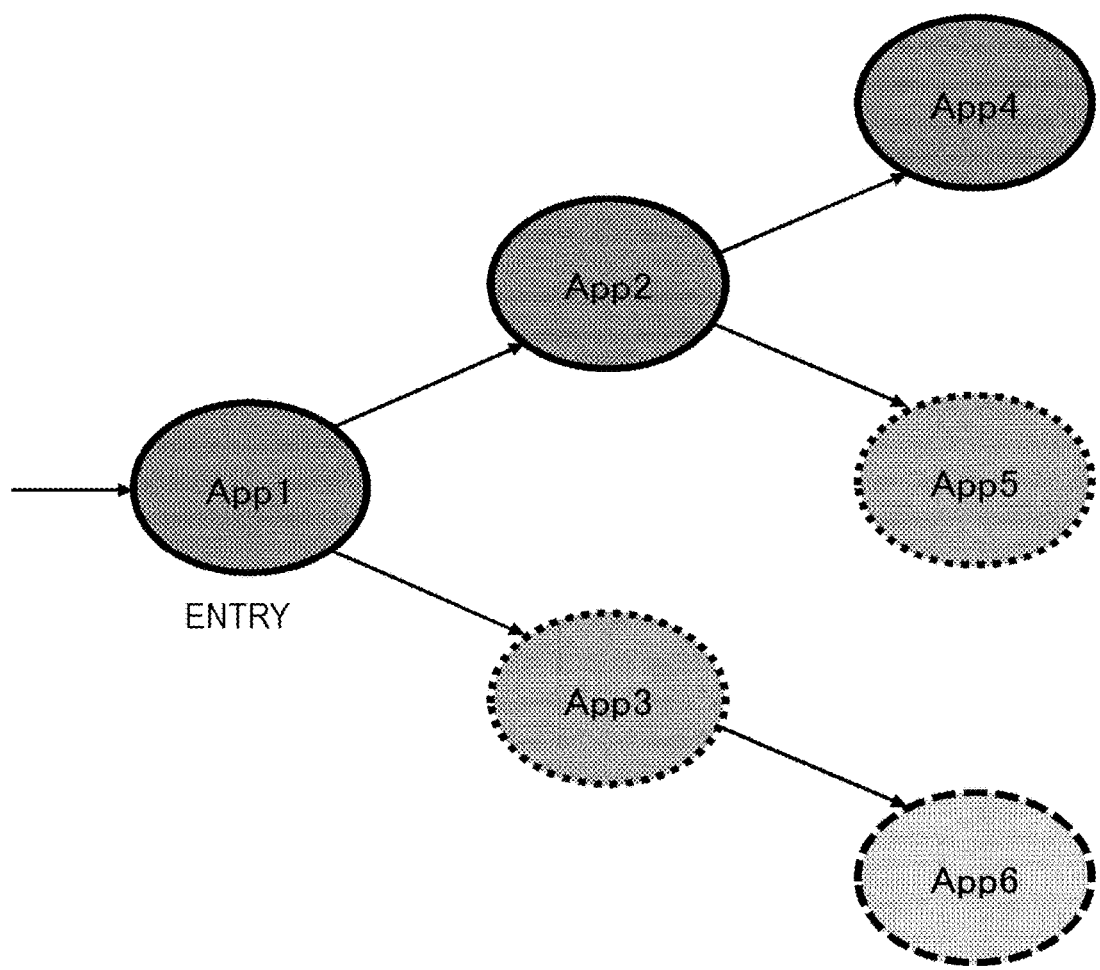
ENTRY
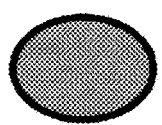 : APPLICATION PRODUCED BY PROGRAM PRODUCTION STATION
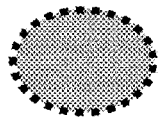 : APPLICATION PRODUCED BY EACH DISTRIBUTION STATION
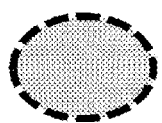 : APPLICATION PRODUCED BY THIRD PARTY

PA MESSAGE 1200

| DATA STRUCTURE | BIT NUMBER | DATA NOTATION |
|---|---|---|
| PA_Message () { | | |
|     message_id | 16 | uimsbf |
|     version | 8 | uimsbf |
|     length | 32 | uimsbf |
|     extension { | | |
|         number_of_tables | 8 | uimsbf |
|         for (i=0; i<N; i++) { | | |
|             table_id | 8 | uimsbf |
|             table_version | 8 | uimsbf |
|             table_length | 16 | uimsbf |
|         } | | |
|     } | | |
|     message_payload { | | |
|         for (i=0; i<N; i++) { | | |
|             table () | | |
|         } | | |
|     } | | |
| } | | |

FIG. 13

MP TABLE 1300

| DATA STRUCTURE | BIT NUMBER | DATA NOTATION |
|---|---|---|
| MMT_Package_Table () { | | |
|     table_id | 8 | uimsbf |
|     version | 8 | uimsbf |
|     length | 16 | uimsbf |
|     reserved | 6 | bslbf |
|     MPT_mode | 2 | bslbf |
|     MMT_package_id_length | 8 | uimsbf |
|     for (i=0; i<N; i++) { | | |
|         MMT_package_id_byte | 8 | bslbf |
|     } | | |
|     MPT_descriptors_length | 16 | uimsbf |
|     for (i=0; i<N; i++) { | | |
|         MPT_descriptord_byte  _1301_  (application_service_descriptor) | 8 | uimsbf |
|     } | | |
|     number_of_assets | 8 | uimsbf |
|     for (i=0; i<N; i++) { | | |
|         identifier_type | 8 | uimsbf |
|         asset_id_scheme | 32 | uimsbf |
|         asset_id_length | 8 | uimsbf |
|         for (i=0; i<N; i++) { | | |
|             asset_id_byte | 8 | uimsbf |
|         } | | |
|         asset_type | 32 | char |
|         reserved | 7 | bslbf |
|         asset_clock_relation_flag | 1 | bslbf |
|         location_count | 8 | uimsbf |
|         for (j=0; j<M; j++) { | | |
|             MMT_general_location_info () | | |
|         } | | |
|         asset_descriptors_length | 16 | uimsbf |
|         for (j=0; j<M; j++) { | | |
|             asset_descriptors_byte | 8 | bslbf |
|         } | | |
|     } | | |
| } | | |

FIG. 14

APPLICATION SERVICE DESCRIPTOR 1400

| DATA STRUCTURE | BIT NUMBER | DATA NOTATION |
|---|---|---|
| application_service_descriptor () { | | |
|     descriptor_tag | 16 | uimsbf |
|     descriptor_length | 8 | uimsbf |
|     application_type   /1401 | 16 | uimsbf |
|     application_priority   /1402 | 8 | bslbf |
|     default_AIT_flag | 1 | bslbf |
|     DT_message_flag | 1 | bslbf |
|     reserved_future_use | 2 | bslbf |
|     EMT_num | 4 | bslbf |
|     AIT_location_info (){ | | |
|         MMT_general_location_info | N | |
|     } | | |
|     if (DT_message_flag==1){ | | |
|         DT_message_location_info (){ | | |
|             MMT_general_location_info () | N | |
|         } | | |
|     } | | |
|     for (j=0;j<EMT_num) { | | |
|         EMT_location_info () { | | |
|             MMT_general_location_info () | N | |
|         } | | |
|     } | | |
| } | | |

FIG. 15

GENERAL LOCATION INFORMATION 1500 

| DATA STRUCTURE | BIT NUMBER | DATA NOTATION |
|---|---|---|
| MMT_general_location_info () { | | |
|     location_type | 8 | uimsbf |
|     if (location_type==0x00) { | | |
|         packet_id | 16 | uimsbf |
|     } | | |
|     if (location_type==0x01) { | | |
|         ipv4_src_addr | 32 | uimsbf |
|         ipv4_dst_addr | 32 | uimsbf |
|         dst_port | 16 | uimsbf |
|         packet_id | 16 | uimsbf |
|     } | | |
|     if (location_type==0x02) { | | |
|         ipv6_src_addr | 128 | uimsbf |
|         ipv6_dst_addr | 128 | uimsbf |
|         dst_port | 16 | uimsbf |
|         packet_id | 16 | uimsbf |
|     } | | |
|     if (location_type==0x03) { | | |
|         network_id | 16 | uimsbf |
|         MPEG_2_transport_stream_id | 16 | uimsbf |
|         reserved | 3 | bslbf |
|         MPEG_2_PID | 13 | uimsbf |
|     } | | |
|     if (location_type==0x04) { | | |
|         ipv6_src_addr | 128 | uimsbf |
|         ipv6_dst_addr | 128 | uimsbf |
|         dst_port | 16 | uimsbf |
|         reserved | 3 | bslbf |
|         MPEG_2_PID | 13 | uimsbf |
|     } | | |
|     if (location_type==0x05) { | | |
|         URL_length | 8 | uimsbf |
|         for (i=o; i<N; i++) { | | |
|             URL_byte | 8 | char |
|         } | | |
|     } | | |
| } | | |

FIG. 16

MH-AIT 1600

| DATA STRUCTURE | BIT NUMBER | DATA NOTATION |
|---|---|---|
| MH-Applicatin_Information_Table(){ | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     application type | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved_future_use | 4 | bslbf |
|     common_descriptor_length | 12 | uimsbf |
|     for(i=0; i<N; i++){ | | |
|         descriptor () | | |
|     } | | |
|     reserved_future_use | 4 | bslbf |
|     application_loop_length | 12 | uimsbf |
|     for(i=0; i<N; i++){ | | |
|         application_identifier () | | |
|         application_control_code | 8 | uimsbf |
|         reserved_future_use | 4 | bslbf |
|         application_descriptor_loop_length | 12 | uimsbf |
|         for (j=0; j<M; j++) { | | |
|             descriptor () | | |
|         } | | |
|     } | | |
|     CRC32 | 32 | rpchof |
| } | | |

FIG. 17

APPLICATION SERVICE DESCRIPTOR 1700

| DATA STRUCTURE | BIT NUMBER | DATA NOTATION |
|---|---|---|
| application_service_descriptor () { | | |
|     descriptor_tag | 16 | uimsbf |
|     descriptor_length    /1701 | 8 | uimsbf |
|     <u>application_type</u> | 16 | uimsbf |
|     default_AIT_flag | 1 | bslbf |
|     DT_message_flag | 1 | bslbf |
|     reserved_future_use | 2 | bslbf |
|     EMT_num | 4 | bslbf |
|     AIT_location_info (){ | | |
|         MMT_general_location_info | N | |
|     } | | |
|     if (DT_message_flag==1){ | | |
|         DT_message_location_info (){ | | |
|             MMT_general_location_info () | N | |
|         } | | |
|     } | | |
|     for (j=0;j<EMT_num) { | | |
|         EMT_location_info () { | | |
|             MMT_general_location_info () | N | |
|         } | | |
|     }     /1702 | | |
|     <u>private_data</u> | N | |
| } | | |

FIG. 18

PRIVATE DATA AREA 1800

| DATA STRUCTURE | BIT NUMBER | DATA NOTATION |
|---|---|---|
| private_data () { | | |
|     data_segment_tag | 4 | bslbf |
|     data_length | 4 | bslbf |
|     data_segment | N*8 | |

FIG. 19 data_segment_tag = 1
data_length = 1
data_segment = application_priority (8bit)

FIG. 20

APPLICATION SERVICE DESCRIPTOR 2000

| DATA STRUCTURE | BIT NUMBER | DATA NOTATION |
|---|---|---|
| application_service_descriptor () { | | |
|     descriptor_tag | 16 | uimsbf |
|     descriptor_length　　2001 | 8 | uimsbf |
|     application_bitmap | 8 | bslbf |
|     default_AIT_flag | 1 | bslbf |
|     DT_message_flag | 1 | bslbf |
|     reserved_future_use | 2 | bslbf |
|     EMT_num | 4 | bslbf |
|     AIT_location_info (){ | | |
|         MMT_general_location_info | N | |
|     } | | |
|     if (DT_message_flag==1){ | | |
|         DT_message_location_info (){ | | |
|             MMT_general_location_info () | N | |
|         } | | |
|     } | | |
|     for (j=0;j<EMT_num) { | | |
|         EMT_location_info () { | | |
|             MMT_general_location_info () | N | |
|         } | | |
|     }　　2002 | | |
|     private_data | N | |
| } | | |

PRIORITY    1    2    3    4

PRIORITY    1    2    3    4

TRANSMISSION DEVICE AND TRANSMISSION METHOD AS WELL AS RECEPTION DEVICE AND RECEPTION METHOD

TECHNICAL FIELD

A technology disclosed in the present specification relates to a transmission device and a transmission method that transmit a data broadcasting application and control information thereon using a predetermined transport system, as well as a reception device and a reception method that receive the data broadcasting application and the control information that have been transmitted by the predetermined transport system and then execute the data broadcasting application on the basis of the control information.

BACKGROUND ART

An ultrahigh-definition TV broadcasting standard based on an MPEG media transport (MMT) system, as a new media transport system, standardized by the MPEG, has been studied as a next-generation digital broadcasting system (e.g., refer to Patent Document 1). The MMT system is easily used with a combination of different transmission lines, and can be used for a plurality of transmission lines for broadcasting and communication, in common.

In the TV broadcasting standard based on the MMT system, streaming media of a broadcast program body, such as video, audio, and subtitles, is transmitted in a timed media processing unit (MPU) format, whereas a system that transmits a data broadcasting application, such as a hyper text markup language (HTML) document, as well as control information on the application, in a non timed MPU format, is also prescribed.

In addition, the data broadcasting application can be broadly divided into a program-linked data broadcasting application linked with a broadcast program and a program-non-linked data broadcasting application, such as news or weather forecasting, not particularly linked with the broadcast program. In addition, a plurality of delivery segments for the data broadcasting application is estimated to be present. For example, management is estimated that a key station being a production source for a broadcast program body, mainly adds an application linked with a broadcast program, whereas each local station being a distribution provider also adds its own application. Each local station can provide information that is not necessarily linked with the broadcast program body but is closely related to a region thereof, such as weather forecasting or local news, through its own application so as to advantageously achieve a data broadcast service with fine granularity for each region.

For local station management of data broadcasting and hybrid cast using broadcast markup language (BML) in filing the present application, transmission of a data broadcasting application as well as control information relating to the application, is considered so as to be independently performed for each delivery segment (for a key station and for local stations) in consideration of preventing demarcation of responsibility and burdens of distribution facilities of the local stations from increasing, in particularly commercial broadcasting.

In studying a broadcasting standard based on the next-generation MMT system, a demand for each local station to add its own application, in the commercial broadcasting, should be sufficiently considered. However, when all data broadcasting applications individually provided from a plurality of the delivery segments, are integrated into a single channel so as to be managed, each local station is required to perform addition and replacement work for its own application with respect to a data flow of the data broadcasting prepared by the key station. As a result, excessive distribution costs are imposed on the local stations, and additionally there is a risk that the work is unsatisfactory.

CITATION LIST

Patent Document

Patent Document 1: JP 2014-200054 A

SUMMARY OF THE INVENTION

Problems to be Solved by the Invention

An object of a technology disclosed in the present specification is to provide an excellent transmission device and transmission method capable of appropriately transmitting a data broadcasting application and control information thereon, using a predetermined transport system.

In addition, the object of the technology disclosed in the present specification is to provide an excellent reception device and reception method capable of appropriately receiving the data broadcasting application and the control information that have been transmitted by the predetermined transport system and executing the data broadcasting application on the basis of the control information.

Solutions to Problems

The technology disclosed in the present specification has been made in consideration of the above problem, and, according to a first aspect of the technology, a transmission device includes: an application transmission unit configured to transmit an application with respect to a broadcast program; and a signaling message transmission unit configured to transmit a signaling message relating to the application. The signaling message transmission unit arranges an application service descriptor for each delivery segment providing the application, into a signaling table transmitted with a predetermined signaling message, so as to transmit the application service descriptor.

According to a second aspect of the technology disclosed in the present specification, the signaling message transmission unit in the transmission device according to the first aspect indicates, in each application service descriptor, location information on the signaling message or the signaling table storing control data necessary or important for managing the application provided by a corresponding delivery segment.

According to a third aspect of the technology disclosed in the present specification, the signaling message transmission unit in the transmission device according to the first aspect indicates, in each application service descriptor, location information on a data transmission message, an application information table, or an event message table, transmitted by a corresponding delivery segment.

According to a fourth aspect of the technology disclosed in the present specification, the signaling message transmission unit in the transmission device according to the first aspect arranges the application service descriptor for each delivery segment, into the signaling table transmitted with the signaling message being an entry point of a broadcast service, so as to transmit the application service descriptor.

According to a fifth aspect of the technology disclosed in the present specification, the signaling message transmission unit in the transmission device according to the first aspect indicates information on application types provided by the delivery segments in each application service descriptor.

According to a sixth aspect of the technology disclosed in the present specification, the signaling message transmission unit in the transmission device according to the fifth aspect further indicates priority for each application type in each application service descriptor.

According to a seventh aspect of the technology disclosed in the present specification, the signaling message transmission unit in the transmission device according to the sixth aspect includes a parameter indicating information on the priority for each application type (application_priority), into each application service descriptor.

According to an eighth aspect of the technology disclosed in the present specification, the signaling message transmission unit in the transmission device according to the sixth aspect indicates information on the priority for each application type, in a private data area arranged in each application service descriptor.

According to a ninth aspect of the technology disclosed in the present specification, the signaling message transmission unit in the transmission device according to the sixth aspect indicates an application type and priority of the application type in a bitmap information area (application_bitmap) having a predetermined bit length.

According to a tenth aspect of the technology disclosed in the present specification, the signaling message transmission unit in the transmission device according to the ninth aspect indicates an application type and priority of the application type in a bitmap information (application_bitmap) area having a predetermined bit length.

According to an eleventh aspect of the technology disclosed in the present specification, the signaling message transmission unit in the transmission device according to the first aspect indicates, in each application service descriptor, whether an application information table for a corresponding delivery segment is specified as an object to be monitored of a default.

According to a twelfth aspect of the technology disclosed in the present specification, the signaling message transmission unit in the transmission device according to the first aspect indicates, in each application service descriptor, information on an event message table count transmitted from a corresponding delivery segment.

According to a thirteenth aspect of the technology disclosed in the present specification, the application transmission unit transmits the application with a first transmission packet including first payload classification information indicating that the application is included in a payload, inserted into a packet header, and the signaling message transmission unit transmits the signaling message with a second transmission packet including second payload identification information indicating that the signaling message is included in the payload, inserted into the packet header, in the transmission device according to the first aspect.

In addition, according to a fourteenth aspect of the technology disclosed in the present specification, a transmission method includes: an application transmission step of transmitting an application with respect to a broadcast program; and a signaling message transmission step of transmitting a signaling message relating to the application. The signaling message transmission step arranges an application service descriptor for each delivery segment providing the application, into a signaling table transmitted with a predetermined signaling message, so as to transmit the application service descriptor.

In addition, according to a fifteenth aspect of the technology disclosed in the present specification, a reception device includes: an application reception unit configured to receive an application with respect to a broadcast program; and a signaling message reception unit configured to receive a signaling message relating to the application. The signaling message reception unit receives a predetermine signaling message storing a signaling table including an application service descriptor for each delivery segment providing the application, arranged into the signaling table to be transmitted.

According to a sixteenth aspect of the technology disclosed in the present specification, the reception device according to the fifteenth aspect further includes: an application control unit configured to control a boot for the application received by the application reception unit. In addition, the application control unit selects the signaling message or the signaling table received with the signaling message, on the basis of priority for each application type with each application service descriptor arranged in the signaling table.

In addition, according to a seventeenth aspect of the technology disclosed in the present specification, a reception method includes: an application reception step of receiving an application with respect to a broadcast program; and a signaling message reception step of receiving a signaling message relating to the application. The signaling message reception step receives a predetermined signaling message storing a signaling table including an application service descriptor for each delivery segment providing the application, arranged into the signaling table to be transmitted.

EFFECTS OF THE INVENTION

According to the technology disclosed in the present specification, an excellent transmission device and transmission method capable of appropriately transmitting a data broadcasting application and control information thereon, using a predetermined transport system, can be provided.

In addition, according to the technology disclosed in the present specification, an excellent reception device and reception method capable of appropriately receiving the data broadcasting application and the control information that have been transmitted by the predetermined transport system and executing the data broadcasting application on the basis of the control information, can be provided.

According to the technology disclosed in the present specification, when a plurality of delivery segments providing a data broadcasting application relating to the same broadcast program is present (e.g., a key station being a program production station, each local station being a distribution station, and a third part), control information relating to the data broadcasting application can be distributed through an independent channel for each delivery segment. Therefore, demarcation of responsibility between the key station and the local stations and burdens of distribution facilities of the local stations can be prevented from increasing.

Note that, the effects described in the present specification are exemplifications, and thus the effect of the present invention is not limited to these. In addition, the present invention may further have an additional effect other than the above effects.

Further detailed descriptions based on an embodiment to be described later and the attached drawings, clarify a further different object, feature, and advantage of the technology disclosed in the present specification.

BRIEF DESCRIPTION OF DRAWINGS

FIG. 8 is a block diagram of an exemplary linkage between data broadcasting applications provided by a plurality of delivery segments.

FIG. 13 is a table of a syntax example 1300 of the MP table stored in the PA message.

FIG. 14 is a table of a syntax example 1400 of an application service descriptor in the MP table.

FIG. 15 is a table of a syntax example 1500 of MMT_general_location_info (general location information).

FIG. 16 is a table of a syntax example 1600 of an MH AIT transmitted with an M2 section message.

FIG. 17 is a table of a different syntax example 1700 of the application service descriptor.

FIG. 18 is a table of a syntax example 1800 of a private data area.

FIG. 19 illustrates an exemplary use of the private data area.

FIG. 20 is a table of another different syntax example 2000 of the application service descriptor.

MODE FOR CARRYING OUT THE INVENTION

An embodiment of a technology disclosed in the present specification will be described in detail with reference to the drawings.

Figure 1:
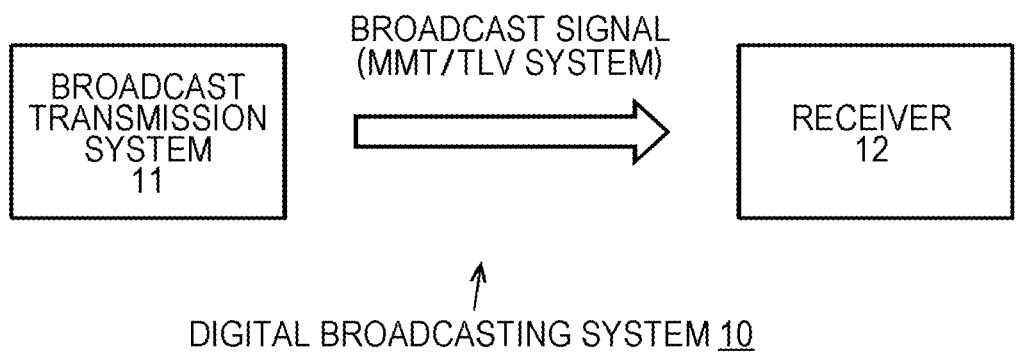
FIG. 1 is a schematic block diagram of an exemplary configuration of a digital broadcasting system 10 to which a technology disclosed in the present specification has been applied.

FIG. 1 schematically illustrates an exemplary configuration of a digital broadcasting system 10 to which the technology disclosed in the present specification has been applied. The digital broadcasting system 10 of the figure includes a broadcast transmission system 11 and a receiver 12.

The broadcast transmission system 11 applies an MMT system to transmission of a broadcast signal, and makes each component included in a broadcast service to be an IP packet so as to transmit the IP packet. Specifically, codes of a video signal and an audio signal of a broadcast program as well as signals of content (e.g., a data broadcasting application) and subtitles relating to the broadcast program, are added onto MMTP payloads so as to be MMTP packets and to be transmitted as IP packets. In addition, the IP packets are transmitted in a TLV packet format through a broadcast transmission line. Here, components, such as video, audio, and subtitles, relating to a broadcast program body, are timed media. In addition, content (e.g., a data broadcasting application described in hyper text transfer protocol (HTML) format) used for data broadcasting, is non timed media.

Meanwhile, the receiver 12 receives the IP packets transmitted from the broadcast transmission system 11 through the broadcast transmission line. The receiver 12, then, the receiver 12 decodes transmission media, such as video, audio, or subtitles, from the reception packets, so as to present an image and a sound. In addition, when acquiring each data file for the data broadcasting from the reception packets, the receiver 12 boots an application engine, such as an HTML browser, so as to present the data broadcasting linked with the broadcast program.

Figure 2:
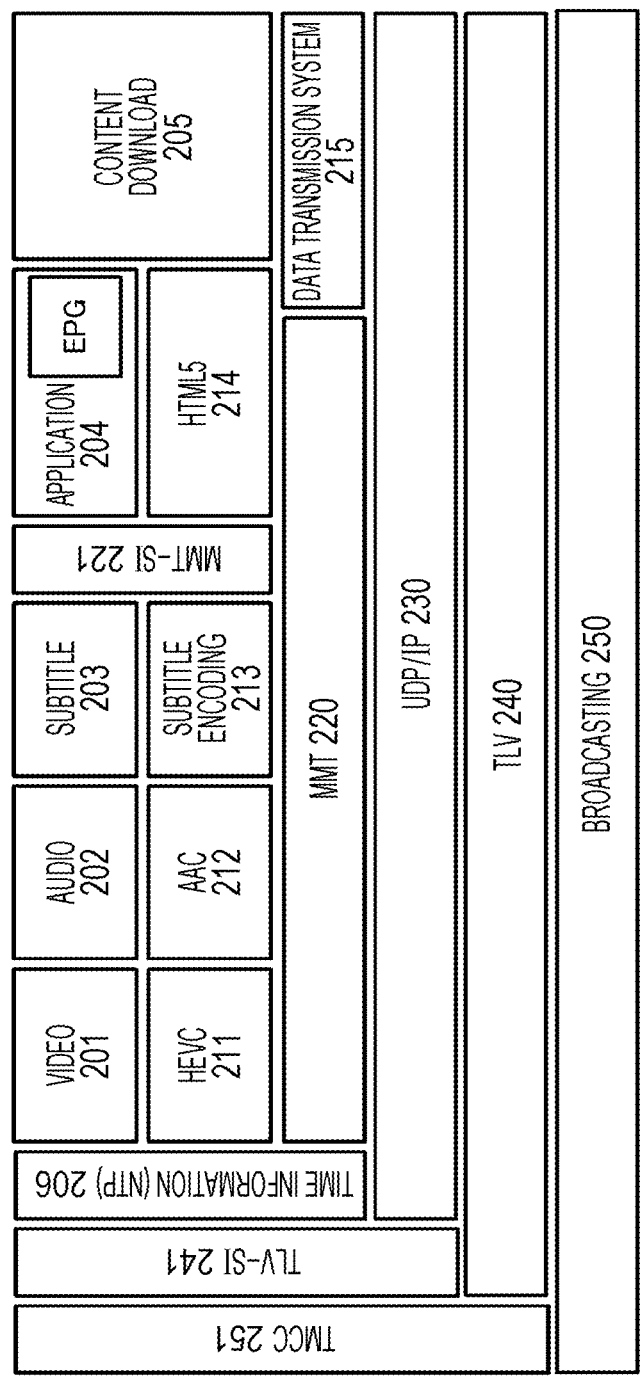
FIG. 2 is a block diagram of a protocol stack 200 of a broadcast system using an MMT system.

FIG. 2 illustrates a protocol stack 200 of the broadcast system using the MMT system.

One broadcast service includes individual components, such as video 201, audio 202, subtitle 203, application 204, and content download 205. The video 201 is made to be encoding 211 in high efficiency video coding (HEVC) format, the audio 202 is made to be encoding 212 in an advanced audio coding (AAC) format, and the subtitle 203 is made to be subtitle encoding 213. In addition, the application 204 including an electric program guide (EPG), is made to be encoding 214 in an HTML5 format.

On an MT layer 220, the encoding components 211 to 214 of the timed media and the non timed media, are each added onto an MMTP payload in an MPU format, so as to be an MMTP packet. In addition, MMT-signaling information (SI) 221 being control information (indicating a configuration of the broadcast program) relating to MMT being a media transport system, is added onto an MMTP payload so as to be an MMTP packet. Note that, four examples of a data transmission system 215 of the content download 205 include a subtitle caption super transmission system, an application transmission system, an event message transmission system, and a general data transmission system, but the descriptions thereof will be omitted.

The MMTP packet is made to be an IP packet in a user datagram protocol (UDP)/IP layer 230. In addition, network time protocol (NTP) packet 206 including information on current time for the timed media, is made to be an IP packet. Furthermore, the IP packets are each made to be a TLV packet in a TLV layer 240 so as to be transmitted through a broadcast transmission line 250 being a lowermost physical layer. In addition, TLV-SI 241 relating to a TLV multiplexing format for multiplexing the IP packets, is made to be a TLV packet so as to be transmitted through the broadcast transmission line 250. A transmission slot including the TLV packets multiplexed, is specified from a transmission and multiplexing configuration control (TMCC) signal 251 of a transmission line, by using TLV stream identification information (TLV_stream_id).

Figure 3:
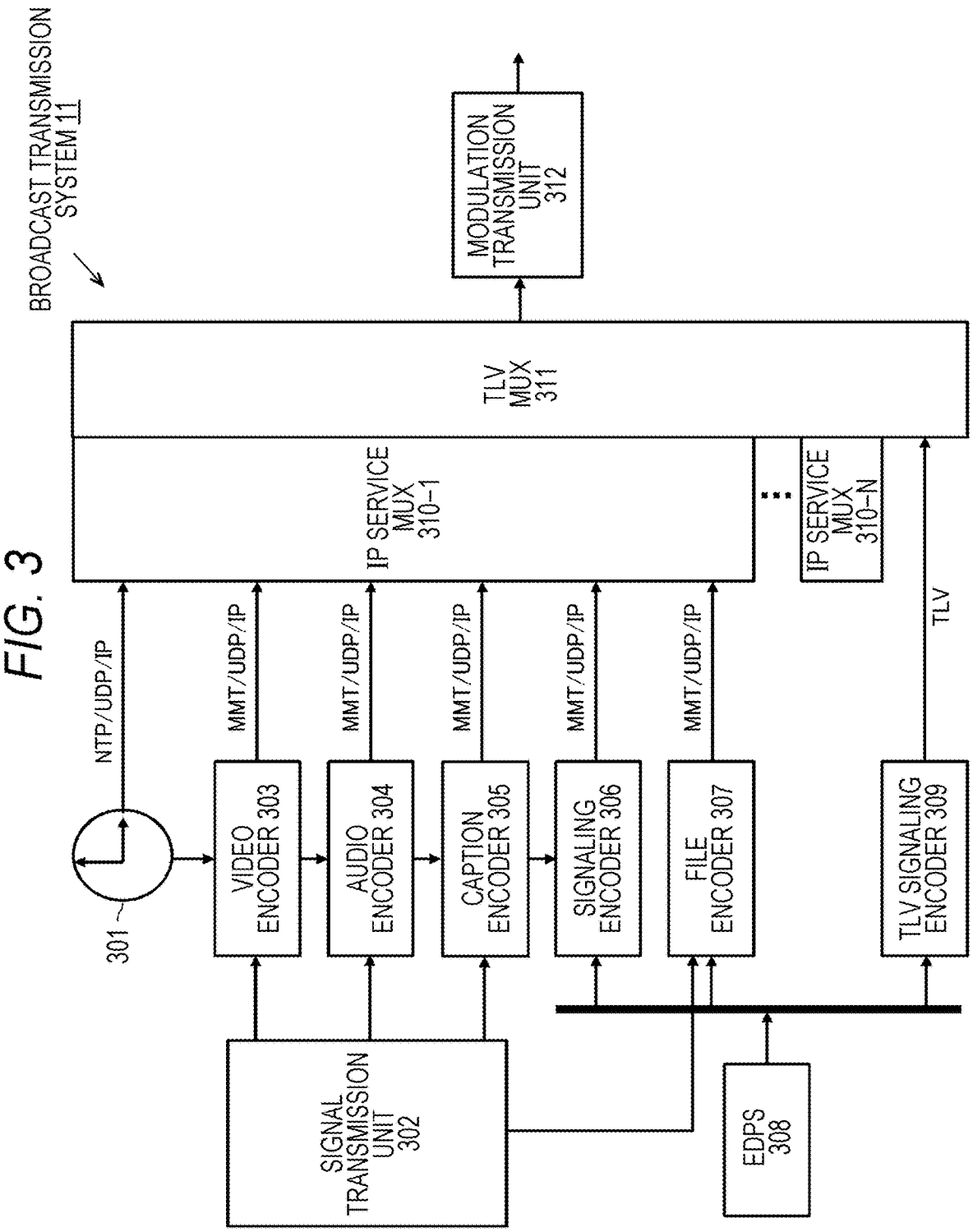
FIG. 3 is a block diagram of an exemplary configuration of a broadcast transmission system 11 that transmits a broadcast signal illustrated in FIG. 2.

FIG. 3 illustrates an exemplary configuration of the broadcast transmission system 11 that transmits the broadcast signal illustrated in FIG. 2. The broadcast transmission system 11 corresponds to, for example, a key station (a program production station) being a production source for the broadcast program body. The broadcast transmission system 11 of the figure includes a clock unit 301, a signal transmission unit 302, a video encoder 303, an audio encoder 304, a caption encoder 305, a signaling encoder 306, a file encoder 307, an electronic data processing system (EDPS) 308, a TLV signaling encoder 309, an IP service multiplexer (MUX) 310, a TLV multiplexer (MUX) 311, and a modulation transmission unit 312.

The clock unit 301 generates time information synchronized with time information acquired from an NTP server (not illustrated), and transmits an IP packet including the time information, to the IP service multiplexer 310.

The signal transmission unit 302 is, for example, a record and playback unit for a studio of a TV broadcast station or VTR, and transmits stream data, such as video, audio, and subtitles, being the timed media, and a data file for the data broadcasting application (e.g., HTML document data) being the non timed media, to the video encoder 303, the audio encoder 304, the caption encoder 305, and the file encoder 307, respectively.

The EDPS 308 is a source for supplying a scheduler of the TV broadcast station as well as a file, and transmits a data broadcasting application being the non timed media, control information indicating a configuration of a broadcast program, and control information on multiplexing of IP packets, to the file encoder 307, the signaling encoder 306, the TLV signaling encoder 309, respectively.

The video encoder 303 performs HEVC encoding to a video signal transmitted from the signal transmission unit 302, and further packetizes the video signal so as to transmit an IP packet including an MMT packet of the video signal, to the IP service multiplexer 310. In addition, the audio encoder 304 performs AAC encoding to an audio signal transmitted from the signal transmission unit 302, and further packetizes the audio signal so as to transmit an IP packet including an MMT packet of the audio signal, to the IP service multiplexer 310. In addition, the caption encoder 305 performs subtitle encoding to a subtitle signal transmitted from the signal transmission unit 302, and further packetizes the subtitle signal so as to transmit an IP packet including an MMT packet of the subtitle, to the IP service multiplexer 310.

The signaling encoder 306 generates a signaling message (MMT-SI) including the control information indicating the configuration of the broadcast program, described therein, on the basis of the information transmitted from the EDPS 308, and then transmits an IP packet including an MMT packet including the signaling message arranged in a payload section, to the IP service multiplexer 310. According to the present embodiment, the signaling message is mainly divided into three types being a package access (PA) message, an M2 section message, and a data transmission message.

The file encoder 307 encodes the data broadcasting application transmitted from the signal transmission unit 302 or the EDPS 308, into a data file in the HTML5 format, and further packetizes the data file so as to transmit an IP packet including an MMT packet thereof, to the IP service multiplexer 310.

The broadcast transmission system 11 includes the IP service multiplexer 310 for each channel (broadcast programs) to be transmitted. The IP service multiplexer 310 for one channel multiplexes the IP packets individually including the video, the audio, the subtitles, the signaling message (MMT-SI), and the data broadcasting application, transmitted from the encoders 303 to 307, so as to generate a TLV packet included in one broadcast service (a channel).

On the basis of the information transmitted from the EDPS 308, the TLV signaling encoder 309 generates a TLV packet including the control information (TLV-SI) on the multiplexing of the IP packets, arranged in a payload section.

The TLV multiplexer 311 multiplexes the TLV packets generated by individual IP service multiplexers 310-1 to 310-N and the TLV signaling encoder 309, so as to generate a TLV stream identified with the TLV stream identification information.

The modulation transmission unit 312 performs RF modulation processing to the TLV stream generated by the TLV multiplexer 311, so as to transmit the TLV stream to a broadcast transmission line.

An operation of the broadcast transmission system 11 illustrated in FIG. 3 will be described.

The clock unit 301 generates the time information synchronized with the time information acquired from the NTP server (not illustrated) so as to generate the IP packet including the time information.

The video signal transmitted from the signal transmission unit 302 is supplied to the video encoder 303. The video encoder 303 performs the HEVC encoding to the video signal, and further packetizes the video signal so as to generate the IP packet including the MMT packet of the HEVC encoded video signal. The IP packet is transmitted to the IP service multiplexer 310.

In addition, similar processing i s performed to the audio signal as well as the subtitle signal, transmitted from the signal transmission unit 302. That is, the IP packet including the MMT packet of the AAC encoded audio signal generated by the audio encoder 304, is transmitted to the IP service multiplexer 310, and additionally the IP packet including the MMT packet of the subtitle encoded signal generated by the caption encoder 305, is transmitted to the IP service multiplexer 310.

In addition, the signaling encoder 306 generates the signaling message (MMT-SI) including the control information indicating the configuration of the broadcast program, described therein, on the basis of the information transmitted from the EDPS 308, so as to generate the IP packet including the MMT packet including the signaling message arranged in the payload section. The IP packet is transmitted to the IP service multiplexer 310.

In addition, the data broadcasting application transmitted from the signal transmission unit 302 or the EDPS 308 is supplied to the file encoder 307. The file encoder 307 encodes the data broadcasting application in the HTML5 format, and further packetizes the data broadcasting application so as to generate the IP packet including the MMT packet thereof. The IP packet is transmitted to the IP service multiplexer 310.

The IP service multiplexer 310 multiplexes the IP packets individually including the video, the audio, the subtitles, the signaling message (MMT-SI), and the data file (an HTML5 document) transmitted from the individual encoders 303 to 307, so as to generate the TLV packet included in one channel.

On the basis of the information transmitted from the EDPS 308, the TLV signaling encoder 309 generates the TLV packet including the control information (TLV-SI) on the multiplexing of the IP packets, arranged in the payload section.

The TLV multiplexer 311 multiplexes the TLV packets generated by the individual IP service multiplexers 310-1 to 310-N and the TLV signaling encoder 309, so as to generate the TLV stream. The modulation transmission unit 312 performs the RF modulation processing to the TLV stream generated by the TLV multiplexer 311, so as to transmit the RF modulated signal to the broadcast transmission line.

Figure 4:
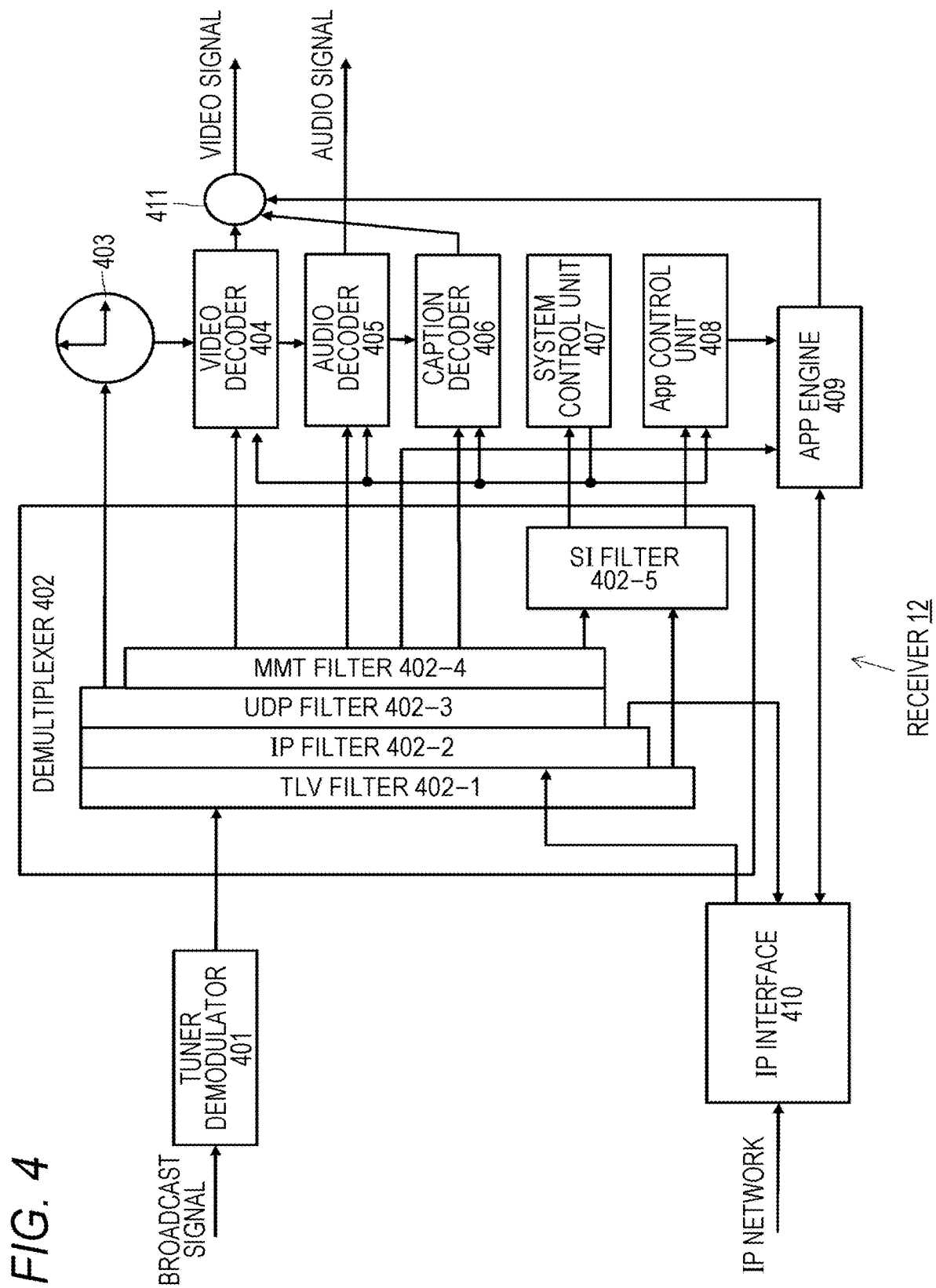
FIG. 4 is a block diagram of an exemplary configuration of a receiver 12 that receives the broadcast signal illustrated in FIG. 2.

FIG. 4 illustrates an exemplary configuration of the receiver 12 that receives the broadcast signal illustrated in FIG. 2. The receiver 12 of the figure includes a tuner demodulator 401, a demultiplexer (DEMUX) 402, a clock restoration unit 403, a video decoder 404, an audio decoder 405, a caption decoder 406, a system control unit 407, an application control unit 408, an application engine 409, an IP interface (I/F) 410, and a synthesis unit 411. Examples of the receiver 12 of the figure, include a TV receiver and a set-top box as well as a retransmitter for IPTV or CATV, installed in a home.

The tuner demodulator 401 selectively receives the broadcast signal and performs demodulation processing so as to acquire the TLV stream. The demultiplexer 402 performs demultiplexing processing and a depacketization processing to the TLV stream. According to the present embodiment, the demultiplexer 402 includes a TLV filter 402-1, an IP filter 402-2, a UDP filter 402-3, an MMT filter 402-4, and an SI filter 402-5.

The TLV filter 402-1 performs filtering to a TLV packet to be broadcast transmitted, on the basis of the TLV stream identification information. On the basis of an IP address, the IP filter 402-2 performs filtering to the IP packets from the TLV packet, and additionally performs filtering to IP packets received through the IP interface 410. In addition, the UDP filter 402-3 performs filtering to a UDP packet. On the basis of information in an MMTP header (to be described later), the MMT filter 402-4 performs filtering to the MMTP packets from the IP packets so as to distribute the MMTP packets individually including the individual encoding components of the video, the audio, the subtitles, and the application, to the video decoder 404, the audio decoder 405, the caption decoder 406, and the application engine 409, respectively. The SI filter 402-5 performs filtering to signaling information SI so as to individually distribute the signaling information into the system control unit 407 and the application control unit 408. The SI filter 402-5 includes an MMT-SI filter that performs filtering of the MMT-SI from an MMT stream, and a TLV-SI filter that performs filtering of the TLV-SI from the TLV stream.

On the basis of the information on current time included in the NTP packet to which the IP filter 402-2 and the UDP filter 402-3 in the demultiplexer 402 have performed the filtering, the clock restoration unit 403 generates time information synchronized with the time information so as to individually output the time information to the video decoder 404, the audio decoder 405, and the caption decoder 406 in order to decode the timed media.

The video decoder 404 decodes the encoded video signal acquired by the demultiplexer 402 so as to acquire a baseband video signal. In addition, the audio decoder 405 decodes the encoded audio signal acquired by the demultiplexer 402 so as to acquire a baseband audio signal. In addition, the caption decoder 406 decodes the subtitle encoded signal acquired by the demultiplexer 402 so as to acquire a subtitle display signal.

The application control unit 408 controls processing of the data broadcasting application, on the basis of the signaling information received through the SI filter 402-5. For example, when analyzing the MMT-SI and then finding the date broadcasting application set in a default entry, the application control unit 407 issues an instruction for presentation processing of the data broadcasting, to the application engine 409.

In the broadcast system 10 according to the present embodiment, the data broadcasting application is estimated to be transmitted through two types of delivery paths being a broadcast signal as well as an IP network. The tuner demodulator 401 performs the reception through the first channel, and the IP interface 410 performs the reception through the second channel. In both cases, the MMT filter 402-4 distributes the MMT packets packetized, in the demultiplexer 402, into the application engine 409.

The application engine 409 being, for example, an HTML browser, performs processing of a data file (e.g., an HTML5document) being an entity of the data broadcasting application so as to generate a data broadcasting display signal. In addition, the application engine 409 can acquire a data file (e.g., mono media used for displaying the data broadcasting or an application of a link destination) necessary for displaying the data broadcasting, from the IP network through the IP interface 410.

The system control unit 407 controls an operation of each unit of the receiver 12, on the basis of the signaling information received through the SI filter 402-5 and operation information from a user through a user operation unit (not illustrated). In addition, the system control unit 407 controls decoding timing in the individual decoders 404 to 406, on the basis of the signaling information, so as to adjust presentation timing for the video, the audio, and the subtitles. The synthesis unit 411 synthesizes the baseband video signal, the subtitle display signal, and the data broadcasting display signal, so as to acquire a video signal for a video display. In addition, the baseband audio signal acquired by the audio decoder 405 is to be an audio signal for audio output. Video output and audio output are performed to the broadcast program body including the video signal and the audio signal, through a monitor display (not illustrated). In addition, the data broadcasting processed by the data broadcasting application engine 409 is superimposed on a screen of the broadcast program body on the monitor display so as to be displayed.

The IP interface 410 includes, for example, a network interface card, and couples to the IP network, such as the Internet or a home network, so as to perform transmission and reception processing of the IP packets.

In addition, according to the present embodiment, the IP packets to which the IP filter 402-2 has performed filtering on the basis of the IP address, are estimated to be transmitted or retransmitted from the IP interface 410 to the IP network. In addition, when it is determined that the filtering can be performed to the broadcast service with only the IP address, only the IP filter 402-2 in the demultiplexer 402 extracts a specific service so that the receiver 12 transfers the specific service to the outside.

An operation of the receiver 12 illustrated in FIG. 4 will be described.

The tuner demodulator 401 receives the broadcast signal and performs the demodulation processing so as to acquire the TLV stream. The demultiplexer 402 performs the demultiplexing processing and the depacketization processing to the TLV stream, and then the NTP time information, the video, the audio, the subtitles, and each encoded signal of the data broadcasting, as well as the signaling information are extracted so as to be individually distributed to the video decoder 404, the audio decoder 405, the caption decoder 406, the application engine 409, the system control unit 407, and the application control unit 408. In addition, the IP packets received by the IP interface 410 are similarly subjected to the demultiplexing processing and the depacketization processing so as to be distributed to each unit.

In addition, the NTP packet extracted by the demultiplexer 402 is distributed to the clock restoration unit 403. The clock restoration unit 403 generates time information, on the basis of the time information included in the NTP packet, synchronized with the time information. That is, the clock restoration unit 403 generates time information in agreement with the time information generated by the clock unit 301 on the side of the broadcast transmission system 11.

The encoded video signal extracted by the demultiplexer 402 is transmitted to the video decoder 404 so as to be decoded so that the baseband video signal is acquired. In addition, the subtitle encoded signal extracted by the demultiplexer 402 is transmitted to the caption decoder 406 so as to be decoded so that the subtitle display signal is acquired.

The application control unit 408 controls the processing of the data broadcasting application, on the basis of the signaling information received through the SI filter 402-5. The application engine 409 being, for example, an HTML browser, performs the processing of the encoded signal (the HTML5 document) of the data broadcasting application extracted by the demultiplexer 402 so as to acquire the data broadcasting display signal, in accordance with an instruction from the application control unit 408.

The synthesis unit 411 synthesizes the baseband video signal, the subtitle display signal, and the data broadcasting display signal, so as to acquire the video signal for the screen display. In addition, the encoded audio signal extracted by the demultiplexer 402 is transmitted to the audio decoder 405 so as to be decoded so that the baseband audio signal for audio output is acquired. Then, the video output and the audio output are performed to the video signal and the audio signal through the monitor display (not illustrated).

Figure 5:
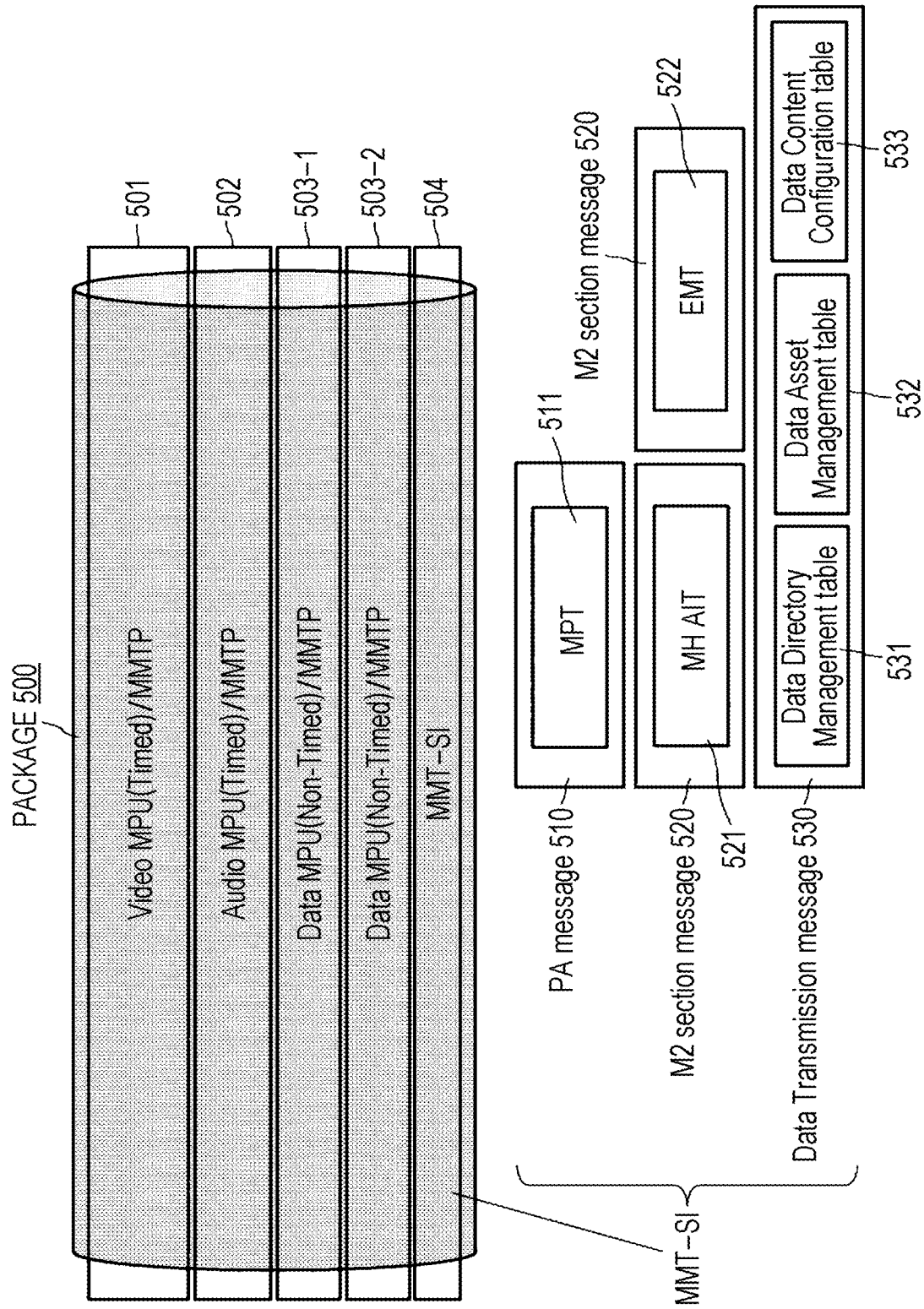
FIG. 5 is a block diagram of an image of a broadcast signal 500 transmitted from the broadcast transmission system 11 to a broadcast transmission line in accordance with an MMT/TLV system.

The broadcast signal is assumed to be transmitted with the MMT system from the broadcast transmission system 11 to the receiver 12 in the digital broadcasting system 10 illustrated in FIG. 1. FIG. 5 illustrates an image of a broadcast signal 500 transmitted from the broadcast transmission system 11 to a broadcast transmission line in accordance with the MMT system.

A broadcast signal of one service (a channel: a broadcast program) includes timed media, such as video, audio, and subtitles, relating to a broadcast program body, and non timed media, such as file data used for data broadcasting linked with the broadcast program. Media data including the timed media and the non timed media encoded is made in the MPU format and then is made MMTP packets so as to be transmitted with IP packets. In addition, signaling information (MMT-SI) (indicating a configuration of the broadcast program) relating to the MMT being the media transport system, is transmitted with an IP packet. The IP packets are transmitted as a TLV stream in a TLV packet format through the broadcast transmission line. Signaling information (TLV-SI) relating to a TLV multiplexing format for multiplexing the IP packets, is also transmitted in the TLV packet format.

In the MMT system, data of timed media and non timed media included in one channel (a broadcast program) can be easily used with a combination of different transmission lines. Assets 501 to 503 for individual types, such as video, audio, subtitles, and a data broadcasting application, are used for the broadcast signal 500, in the example illustrated in FIG. 5. Note that, illustration for an asset for subtitle data is omitted in the figure for convenience. Each asset corresponds to one IP data flow. The IP data flow referred to here, is a set of IP packets including values of five types of fields being a transmission source IP address of an IP header and an UDP header, a destination IP address, a protocol classification of the IP header, a transmission source port number, and a destination port number, the same.

The broadcast system 11 based on the MMT system, is a system that transmits the IP packets through the broadcast transmission line, and additionally can manage mapping of one IP address for each broadcast service (or for each broadcast station). In this case, filtering is performed to the broadcast signal 500 on the side of the receiver on the basis of the IP address so that the individual assets 501 to 503 of a desired broadcast service (or a desired broadcast station) can be accessed. The MMT protocol (MMTP) packets transmitted with the individual assets 501 to 503 in the same IP address, can be uniquely specified with packet identification information (packet_id: PID). In addition, MMTP packets on a different IP address can be specified with a combination of the packet identification information, the IP address, and the port number.

One channel (a broadcast program) can be regarded as a "package" including a plurality of assets being different types, such as video, audio, subtitles, and file data (a data broadcasting application). The "package" referred to here is a logic set of media data transmitted with the assets. In addition, the "assets" referred to here are each an entity of data used for constructing presentation of multimedia, in association with unique asset identification information (asset_id). Note that, the assets each have correspondence relationship with a component (a video asset corresponds to a video component, an audio asset corresponds to an audio component, and a data broadcasting application asset corresponds to a data component).

Each asset includes one or more sets of MPUs (a logic group) sharing the same asset identification information. The MPUs can be regarded as a format being a unit in transmission in the MMT system. The individual MPUs are transmitted with dedicated elementary streams (ESs) of the corresponding assets, namely, the assets 501 to 503. That is, an MMTP packet of an encoded video signal including an MPU logic group of a video signal having the same asset identification information, is transmitted through the video asset 501. Similarly, an MMT packet of an encoded audio signal including an MPU logic group of an audio signal having the same asset identification information, is transmitted through the audio asset 502, and an MMT packet of an encoded application including an MPU logic group of a data broadcasting application having the same asset identification, is transmitted through the data asset 503. Each individual MPU is specified with the asset identification information and an MPU sequence number on the corresponding asset. In addition, the assets that individually transmit the media, can be identified with the asset identification information.

A plurality of assets having the same type (namely, having different asset identification information) may be transmitted in one package (a broadcast program). For example, at least two delivery segments each provide a data broadcasting application to the same broadcast program. For example, a program-linked data broadcasting application linked with a broadcast program provided from a key station that has produced the program, and a program-non-linked data broadcasting application (e.g., weather forecasting or news) not linked with the broadcast program, provided from a local station that distributes the program, are typically allocated with individual pieces of different asset identification information as different assets, so as to be transmitted, as different MPU logic groups, with the different assets. An asset 503-1 for a data broadcasting application provided from the program production station and an asset 503-2 for a data broadcasting application provided from the local station that distributes the program, are illustrated for each delivery segment, in the example illustrated in FIG. 5.

In addition, the MMT system can be used for a plurality of transmission lines for broadcasting and communication in common. For example, the non timed media, such as a data broadcasting application (e.g., an HTML5 document), can be also provided through a communication transmission line (not illustrated), such as an IP network, other than the transmission, as the data asset 503, with the timed media, as illustrated in FIG. 5.

An MMTP packet including the MMT-SI being a transmission control signal indicating information relating to a configuration of the MMT package and the broadcast service, is repeatedly transmitted by a carousel system in a signaling 504. Note that, illustration of a transmission line for the TLV-SI is omitted in FIG. 5.

Examples of the signaling message of the MMT-SI transmitted with the signaling 504, can include a PA message 510, an M2 section message 520, and a data transmission message 530.

For example, the PA message 510 is control information indicating the configuration of the broadcast program, and is a container storing an MMT package (MP) table 511 including information, such as a list of the assets and positions thereof, included in the package, described therein.

The PA message 510 is an entry point of the broadcast service, and fixed packet identification information (e.g., 0x0000) is allocated to the MMTP packet that transmits the PA message 510. Therefore, the fixed packet identification information is specified on the signaling 504 so that the PA message 510 can be acquired, on the side of the receiver. Then, referring to the MP table 511 transmitted with the PA message 510 can specify each asset (e.g., the video, the audio, the subtitles, or the file data (the data broadcasting application)) included in the package (the broadcast program).

In addition, the M2 section message 520 is a message for transmitting a section extended format of MPEG-2 Systems. Signaling tables, such as an MH-application information table (AIT) 521 and an event message table (EMT) 522, are singly stored in the M2 section messages 520.

The MH-AIT 521 is a table for transmitting dynamic control information on the application and additional information necessary for the execution, and specifically specifies a processing method for the data broadcasting application (the file data), as a data asset, transmitted through the broadcast transmission line (e.g., a boot state applied to the application), as well as a location (URL).

The EMT 522 is a signaling table used for the event message transmission system, and stores information (an event message descriptor) on an event message (timed and non timed messages from the broadcast station with respect to the application on the receiver). The event message transmission system provides means of transmitting message information promptly or at specified time, from the broadcast station with respect to the data broadcasting application operating in the receiver.

In addition, the data transmission message 530 is a message for transmitting control information on the transmission of the data broadcasting application. The one data transmission message 530 stores individual signaling tables of a data directory management table (DDMT) 531, a data asset management table (DAMT) 532, and a data content configuration table (DCCT) 533.

The data directory management table 531 is a table for managing the data broadcast application per directory unit (in other words, per data-broadcasting-application production unit). The table includes directory structure relating to a directory included in one package as well as a subdirectory and a file (an item) included in the directory, described therein, so that a file configuration of the application and a configuration for file transmission can be separated.

The data asset management table 532 is a table for managing the data broadcasting application per asset unit, and includes version information for each MPU with respect to a configuration of the MPU in the asset, described therein.

The data content configuration table 533 is a table for managing the data broadcasting application per presentation unit (PU). The table includes information on the file configuration of the data broadcasting application per presentation unit (PU) in the data broadcasting, described therein, and can be used for cache control flexible and effective for the file data for the data broadcasting application, on the side of the receiver.

The three types of the signaling tables 531 to 533 transmitted with the data transmission message, are used in the transmission system of the data broadcasting application with the MMT so that a data structure per usage unit, such as per application unit and per presentation unit, can be expressed for an effective use of a cache memory in the receiver, the data structure being independent of a transmission data structure per file unit and a directory structure in producing content (the data broadcasting application) (e.g., refer to Japanese Patent Application No. 2014-88630 that has already been ceded to the present applicant).

Figure 6:
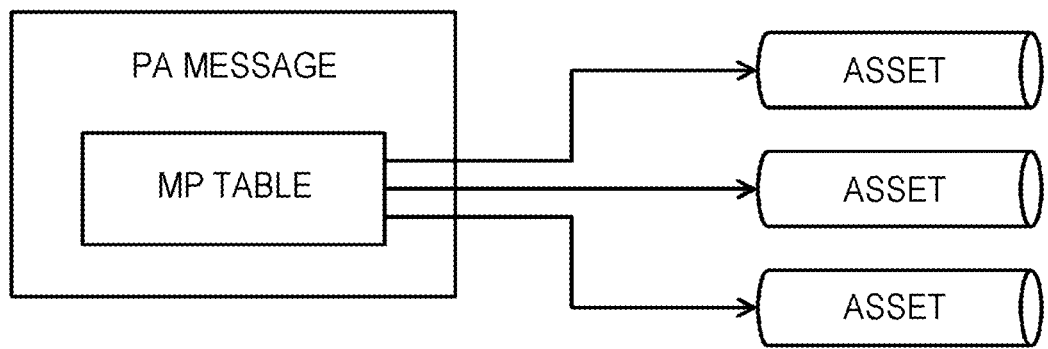
FIG. 6 is a block diagram of a mechanism for specifying each asset of a package from an MP table in a PA message.

The packet identification information on the messages and the tables transmitted as the MMT-SI, may be fixed or is indirectly specified by a different table. For example, the PA message is the entry point of the broadcast service and the fixed packet identification information (e.g., 0x0000) is allocated thereto. Each asset (e.g., the video, the audio, the subtitles, or the file data (the data broadcasting application)) included in the package (the broadcast program) is specified in the MP table transmitted with the PA message. Therefore, as illustrated in FIG. 6, each asset (e.g., the video, the audio, the subtitles, or the file data (the data broadcasting application)) included in the package (the broadcast program) can be specified by referring to the MP table.

Figure 7:
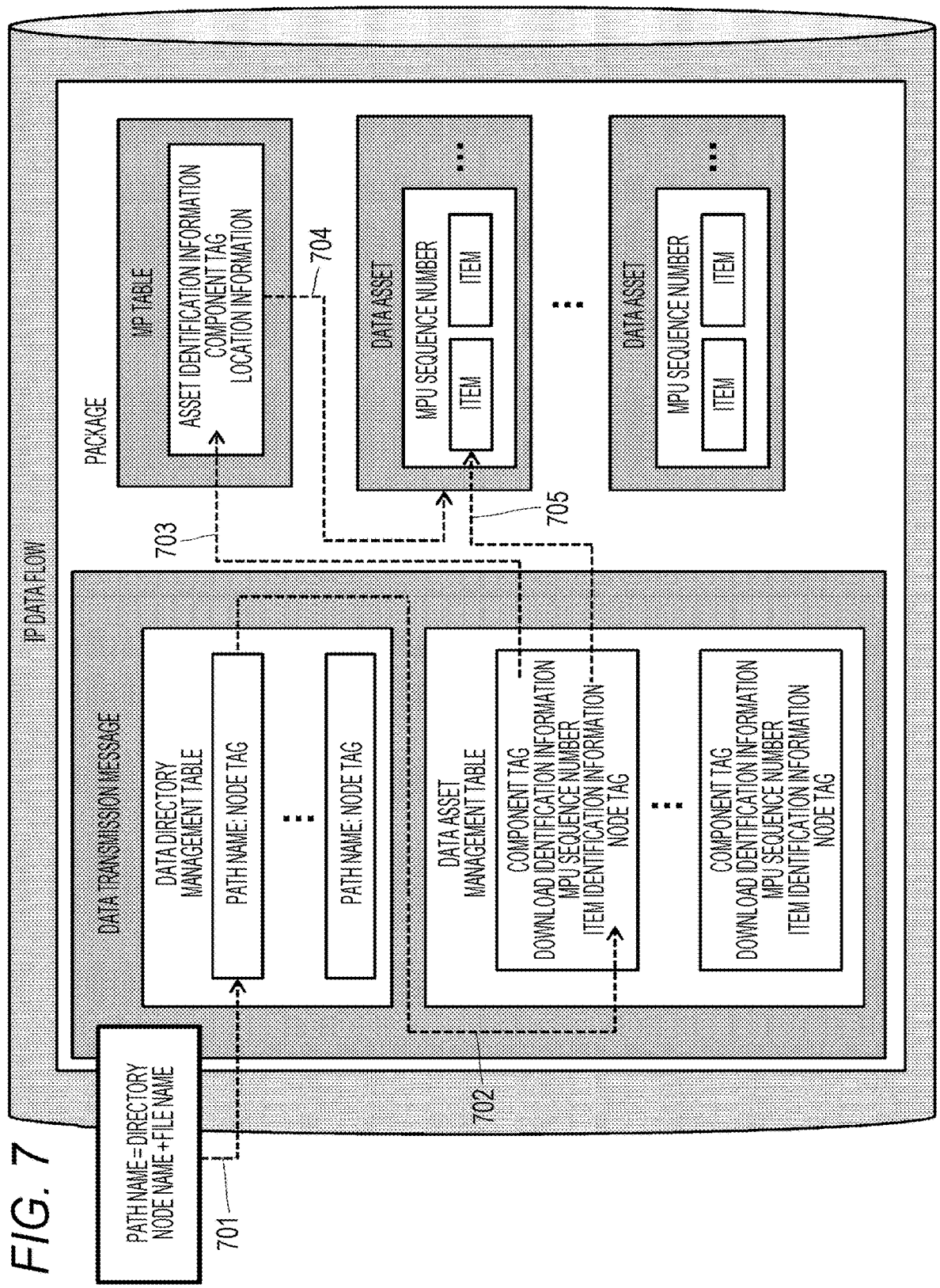
FIG. 7 is a block diagram for describing a mechanism for acquiring a file included in a data broadcasting application to which MMT transmission is performed.

FIG. 7 illustrates a mechanism for acquiring an item of the data broadcasting application, multiplexed in the same IP data flow.

A path name is specified to the item (a data file) included in the data broadcasting application, in an application description, such as HTML5. The path name referred to here is described with a combination of a directory node name and a file name. In addition, a node tag is prescribed as a descriptor including a directory node and a file integrated, and is used as information linked with each signaling table.

When the path name is specified from the data broadcasting application, as indicated with reference number 701, the node tag of the file of the specified path name can be acquired from a data directory management table in a data transmission message.

Next, as indicated with reference numeral 702, a component tag, download identification information, an MPU sequence number, and item identification information, for an asset including the item having the node tag acquired from the data directory management table, transmitted, can be acquired from a data asset management table in the same data transmission message.

Furthermore, as indicated with reference numeral 703, when location information on the asset having the component tag acquired from the data asset management table, is acquired from an MP table, as indicated with reference numeral 704, a data asset including the corresponding file to be transmitted in practice, can be specified.

Then, a unit o f file repeated transmission corresponding to the carousel, can be uniquely identified with the download identification information acquired from the data asset management table and download identification information described in a header area of the MMTP packet that transmits the item, in the specified data asset. As indicated with reference numeral 705, an item having the MPU sequence number and the item identification information acquired from the data asset management table, can be specified, as a desired file, from the item to be repeatedly transmitted. The node tag, the MPU sequence number, and the item identification information are unique in the data transmission message, in the asset (the IP data flow), and in a service provider (a delivery segment), respectively.

Note that, for example, refer to Japanese Patent Application No. 2014-250279 that has already been ceded to the present applicant, for detailed configurations of the individual signaling tables of the data directory management table, the data asset management table, and the data content configuration table, transmitted with the data transmission message.

A plurality of delivery segments that provides a data broadcasting application to the same broadcast program, is estimated to be present in a digital broadcast service. For example, management is estimated that a key station being a production source for a broadcast program body, mainly adds an application linked with a broadcast program, whereas each local station being a distribution provider also add its own application. Each local station can provide information that is not necessarily linked with the broadcast program body but is closely related to a region thereof, such as weather forecasting or local news, through its own application so as to advantageously achieve a data broadcast service with fine granularity for each region. The asset 503-1 for the data broadcasting application provided from the program production station and the asset 503-2 for the data broadcasting application provided from the local station that distributes the program, are illustrated for each delivery segment, in the example illustrated in FIG. 5. Furthermore, a third party not being the program production station and the distribution station, is estimated to provide a data broadcasting application through a wide area network, such as the Internet.

FIG. 8 illustrates an exemplary linkage between data broadcasting applications provided by individual delivery segments of a program production station, distribution stations, and a third party, with respect to the same broadcast program.

In FIG. 8, an App1, an App2, and an App4 are data broadcasting applications provided by a key station being the program production station. The program production station transmits the applications, such as the App1, the App2, and the App4, produced by itself, together with assets, such as video, audio, and subtitles, included in a broadcast program body, as a broadcast signal, through the same IP data flow (a delivery path). Such a data broadcasting applications provided by the program production station, includes, for example, an application that relates to or is linked with the broadcast program.

In addition, an App3 and an App5 are data broadcasting applications provided by local stations being the distribution stations. The App3 and the App5 are data broadcasting applications that provide information closely related to a region, such as weather forecasting or local news, the data broadcasting applications being not linked with the broadcast program. The distribution stations transmit, as broadcast signals, their own data broadcasting applications, such as the App3 and the App5, through IP data flows (namely, independent delivery paths) different from that of the program production station.

In addition, an App6 is a data broadcasting application provided by the third party not being the program production station and the distribution stations, the data broadcasting application being linked or not linked with the broadcast program. The third party distributes its own application, such as the App6, through a wide area network (namely, an independent delivery path), such as the Internet. Note that, the program production station and the distribution stations may distribute the data broadcasting application produced thereby through the wide area network instead of the broadcast signals.

The data broadcasting application App1 provided from the program production station is set to be a default entry of the broadcast program, and additionally is linked with the different data broadcast application App2 provided from the program production station as well as the data broadcasting application App3 provided from the distribution station, in the example illustrated in FIG. 8. A page transition operation expected when the linkage is formed between the applications of the figure, will be described below.

The receiver that has received the broadcast program, first executes the data broadcasting application App1 specified as the entry, in booting the data broadcasting, and then the data broadcasting application App1 transitions to the different data broadcasting application App2 or App3 included in the linkage in response to an operation of the user and an event message.

The data broadcasting application App2 provided from the program production station, is further linked with the different data broadcasting application App4 provided from the program production station, as well as the data broadcasting application App5 provided from the distribution station. Therefore, the receiver executes the data broadcasting application App2 so that a page transitions, and then the data broadcasting application App2 transitions to the data broadcasting application App4 or App5 in response to an operation of the user and an event message.

In addition, the data broadcasting application App3 provided from the distribution station, is further linked with the data broadcasting application App6 provided from the third party. Therefore, the receiver executes the data broadcasting application App3 so that a page transitions, and then the data broadcasting application App3 transitions to the data broadcasting application App6 in response to an operation of the user and an event message.

For local station management of data broadcasting and hybrid cast using current BML, transmission of a data broadcasting application as well as control information relating to the application, is considered so as to be independently performed for each delivery segment (for a key station and for local stations) in consideration of preventing demarcation of responsibility and burdens of distribution facilities of the local stations from increasing, in particularly commercial broadcasting.

A demand for each local station and a third party, other than a program production station, to provide their own data broadcasting applications (namely, a plurality of delivery segments provides their own data broadcasting applications to one broadcast program), in commercial broadcasting, should be sufficiently considered even in a next-generation broadcast standard to which the media transport system based on the MMT is applied.

However, when all the data broadcasting applications individually provided from the plurality of delivery segments, are integrated into a single channel so as to be managed, for example, the local stations need to add the data broadcasting applications to a broadcast program distributed from the key station. In this case, the local stations are required to perform addition and replacement work for their own applications with respect to an IP data flow through which the key station transmits the broadcast program, an application accompanied therewith, and control information on the application. As a result, the local stations increase the burdens of the distribution facilities and distribution costs and additionally a risk occurs in performing the addition and replacement work for the applications, so that the demarcation of responsibility between the key station and the local stations, becomes ambiguous.

The present specification proposes the technology for the plurality of delivery segments, such as the key station being a program production station, each local stations being a distribution station, and the third party, to achieve independent management of a data broadcasting application in the next-generation broadcast standard to which the media transport system based on the MMT is applied. The descriptions of the proposition will be further given in detail.

A PA message being one of signaling messages is to be an entry point of a broadcast program (a fixed packet identifier (e.g., 0x0000) is allocated), and an MP table including information on a list of assets and positions thereof included in a package, described therein, is included in the PA message, as already described above.

In addition, an MH-AIT table, a data directory management table, a data asset management table, and a data content configuration table, are important signaling tables relating to transmission control of a data broadcasting application. In addition to these, an EMT used for the event message transmission system is also an important signaling table for the management of the data broadcasting application.

Therefore, grouping is first performed to signaling messages and signaling tables for each delivery segment in order for each delivery segment to achieve the independent management of the data broadcasting application, in the technology disclosed in the present specification. Here, the signaling messages and the signaling tables to which the grouping is performed, are control data, such as a data transmission message, the MH-AIT, and the EMT, necessary or important for the management of the data broadcasting application.

Then, a new descriptor being an application service descriptor, is arranged for each delivery segment, in the MP table including control information on a broadcast service level, described therein. More specifically, the application service descriptor is arranged for each application type of the data broadcasting application provided by the same delivery segment. Location information on each piece of the control data necessary or important for managing the data broadcasting application provided by the corresponding delivery segment, is indicated in each application service descriptor. In addition, a default AIT flag indicating that the corresponding application information table has been set to be an AIT to be monitored of a default, is further indicated in the application service descriptor.

Note that, on the basis of the location information on the data transmission message indicated with the application service descriptor, location information on three signaling tables of the data directory management table, the data asset management table, and the data content configuration table, stored in the message, is indicated. On the other hand, location information on the MH-AIT and the EMT, indicated with the application service descriptor, is equivalent to location information on M2 section messages singly storing the individual tables.

In addition, the application service descriptor further indicates formats of the data broadcasting application provided from the corresponding delivery segment, namely, application types and priority for each application type.

Figure 9:
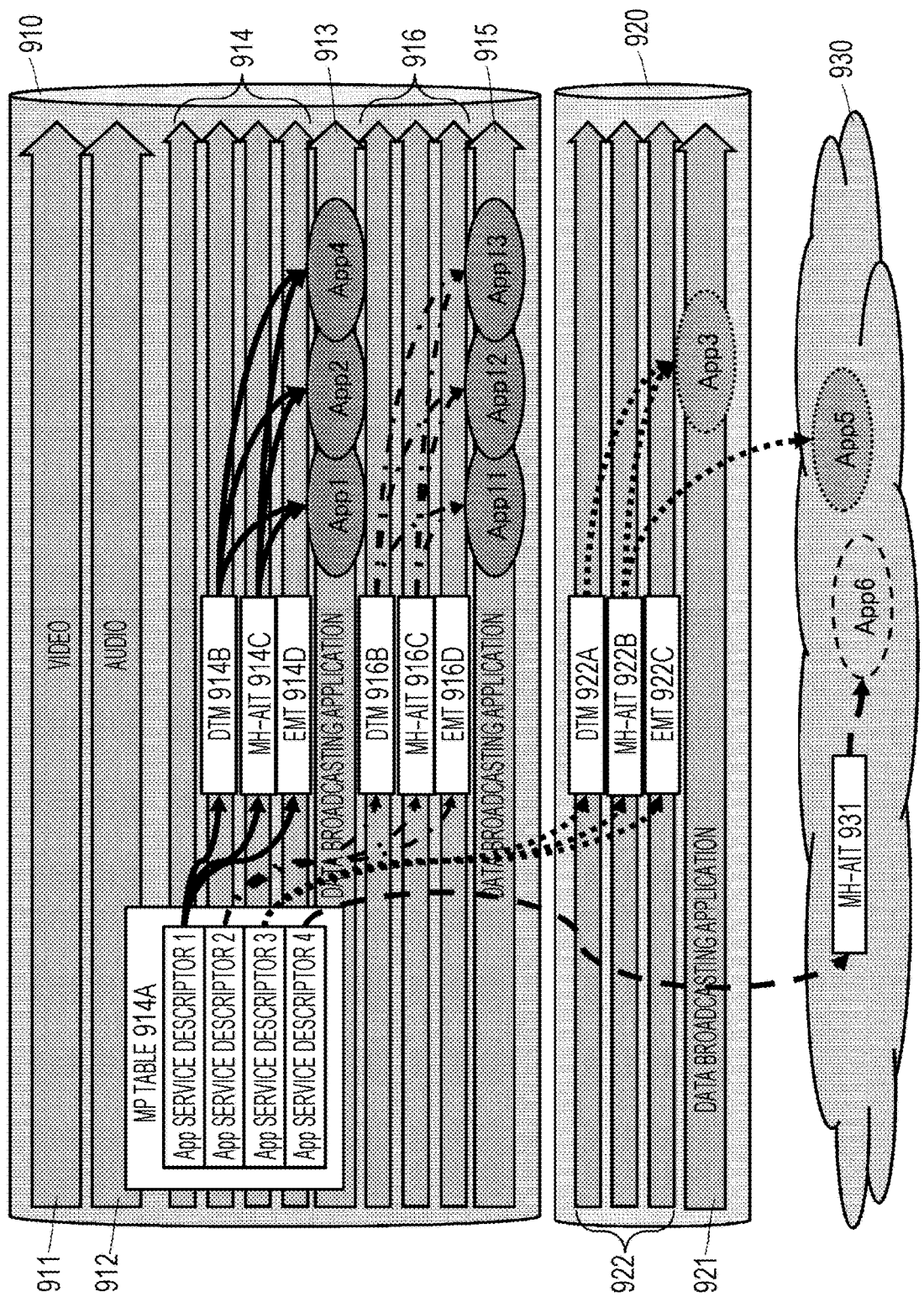
FIG. 9 is a block diagram of an exemplary configuration of a broadcast signal including a broadcast signal for each delivery segment, distributed through an independent channel.

FIG. 9 illustrates an exemplary configuration of a broadcast signal including the data broadcast application for each delivery segment and the control information relating to the application with respect to the same broadcast program, distributed through an independent channel, on the basis of information described in the application service descriptor for each delivery segment.

Reference numeral 910 is an IP data flow for transmitting a broadcast signal from a program production station. The IP data flow 910 includes a plurality of assets and signalings 911 to 916 in the same IP address. Each MMTP packet to be transmitted, having the same IP address, can be specified with only a packet identifier in the IP data flow 910.

Assets indicated with reference numerals 911 and 912 transmit video data and audio data of a broadcast program body produced by the program production station, in an MPU format, respectively. In addition, an asset indicated with reference numeral 913 transmits data broadcasting applications App1, App2, and App4 in an HTML5 format, for example, produced in relation to the broadcast program body, by the program production station.

The signaling indicated with reference numeral 914 transmits control information relating to the data broadcasting applications in the HTML5 format transmitted through the data asset 913, namely various signaling messages as well as signaling tables. FIG. 9 illustrates only an MP table 914A stored in a PA message to be transmitted, a data transmission message (DTM) 914B, an MH-AIT 914C, and an EMT 914D, necessary or important for managing the data broadcast applications, in order to simplify the drawing.

In addition, an asset indicated with reference numeral 915 transmits data broadcasting applications App11, App12, and App13 in a description format (e.g., a Java format) instead of the HTML5, produced in relation to the broadcast program body, by the program production station.

The signaling indicated with reference numeral 916 transmits control information relating to the data broadcast applications in the java format, transmitted through the data asset 915, namely, various signaling messages as well as signaling tables. FIG. 9 illustrates only a data transmission message (DTM) 916B, an MH-AIT 916C, and an EMT 916D, necessary or important for managing the data broadcasting applications, in order to simplify the drawing.

Reference numeral 920 is an IP data flow for transmitting a data broadcasting application transmitted from a distribution station as well as control information relating thereto, and includes a data asset 921 and a signaling 922.

The distribution station transmits a data broadcasting application App3 corresponding to the broadcast program body in a data asset indicated with reference numeral 921.

The signaling indicated with reference numeral 922 transmits control information relating to the data broadcasting application App3 transmitted through the data asset 921, namely, various signaling messages as well as signaling tables. FIG. 9 illustrates only a data transmission message 922A, an MH-AIT 922B, and an EMT 922C, necessary or important for managing the data broadcasting application, in order to simplify the drawing.

Reference numeral 930 is an IP network, such as the Internet. The distribution station transmits an App5 being one of data broadcasting applications corresponding to the broadcast program body, through the IP network 930. In addition, a third party transmits a data broadcasting application App6 corresponding to the broadcast program body, through the IP network 930. The third party further distributes an MH-AIT 931 including a processing method of the data broadcasting application App6 provided by itself (e.g., a boot state applied to the application) as well as location information (URL) described therein, through the IP network 930. Note that, a data transmission message as well as an EMT are unnecessary to transmit for the data broadcasting applications App5 and App6 distributed through the IP network 930 (a communication transmission line).

An application service descriptor is arranged for each application description format of each delivery segment, in the MP table 914A stored in the PA message transmitted by the signaling 914. Location information on each piece of the control data necessary or important for managing the data broadcasting applications provided by the corresponding delivery segment, is indicated in each application service descriptor.

Specifically, the application service descriptor 1 arranged in the MP table 914A is arranged so as to be associated with the data broadcasting applications transmitted by the program production station through the data asset 913, and indicates location information (a packet identifier in the same IP address) on the data transmission message 914B, the MH-AIT 914C, and the EMT 914D transmitted with the signaling 914.

In addition, the application service descriptor 2 arranged in the MP table 914A is arranged so as to be associated with the data broadcasting applications transmitted by the program production station through the data asset 915, and indicates location information (a packet identifier in the same IP address) on the data transmission message 916B, the MH-AIT 916C, and the EMT 916D transmitted with the signaling 916.

In addition, the application service descriptor 3 arranged in the MP table 914A is arranged so as to be associated with the data broadcasting applications transmitted by the distribution station through the data asset 921 as well as through the IP network 930, and indicates location information (a packet identifier in the same IP address) on the data transmission message 922B, the MH-AIT 922C, and the EMT 922D transmitted with the signaling 922.

In addition, the application service descriptor 4 arranged in the MP table 914A is arranged so as to be associated with the data broadcasting application transmitted by the third party through the IP network 930, and indicates the location information (URL) of the MH-AIT 931 transmitted from the third party through the IP network 930. Note that, a data transmission message as well as an EMT are unnecessary to transmit for the data broadcasting application App6 distributed through the IP network 930 (the communication transmission line) instead of the broadcast transmission line.

The application service descriptors 1 to 4 each include a default flag indicating that an application has been set in a default entry, and further indicates the types of the formats (description formats) of the data broadcasting applications provided from the corresponding delivery segment and the priority for each type of the application (description formats) (as described above).

When receiving the broadcast signal (the signaling) 914 from the program production station, the receiver analyzes the MP table 914A stored in the PA message being an entry point of MMT-SI so as to acquire the application service descriptors 1 to 4 arranged for each delivery segment providing the data broadcast application.

Then, the receiver acquires the location information on the data transmission message 914B, the MH-AIT 914C, and the EMT 914D, transmitted by the program production station through the signaling 914, from the application service descriptor 1, and additionally can acquire an application processing method of the data broadcasting applications App1, App2, and App4 in the HTML5 format (e.g. a boot state applied to the applications), transmitted by the program production station through the data asset 913 on the basis of the MH-AIT 914C, as well as location information (URL). In addition, the receiver acquires the location information on the data transmission message 916B, the MH-AIT 916C, and the EMT 916D transmitted by the program production station through the signaling 916, from the application service descriptor 2, and additionally can acquire an application processing method of the data broadcasting applications App11, App12, and App13 in the Java format (e.g. a boot state applied to the applications), transmitted by the program production station through the data asset 915 on the basis of the MH-AIT 916C, as well as location information (URL).

Similarly, the receiver acquires the location information on the data transmission message 922B, the MH-AIT 922C, and the EMT 922D transmitted by the distribution station through the different IP data flow 920 (the signaling 922), from the application service descriptor 3, and additionally can acquire an application processing method of the data broadcasting application App3 (e.g. a boot state applied to the applications), transmitted by the distribution station through the IP data flow 920 (the data asset 921) or the IP network 930 on the basis of the MH-AIT 922C, as well as location information (URL).

Similarly, the receiver acquires the location information on the MH-AIT 931 transmitted by the third party through the IP network 930, from the application service descriptor 4, and additionally can acquire an application processing method of the data broadcasting application App6 (e.g. a boot state applied to the application), transmitted by the third party through the IP network 930 on the basis of the MH-AIT 931, as well as location information (URL).

In addition, the application service descriptors 1 to 4 each use the default flag so as to indicate whether any of the MH-AITs 914C, 916C, 922B, and 931 indicating the location information is the AIT to be monitored of the default. Furthermore, the MH-AIT specifies "autostart" (a boot of the application), as application_control_code, to only one application from a plurality of applications to be controlled, so that the only automatic boot can be made. As a result, a specific application is recognized to be a default entry. With reference to FIG. 9, for example, the application service descriptor 1 associated with the program production station indicates that the MH-AIT 914C is the AIT to be monitored of the default, and additionally the "autostart" (the boot of the application) is specified to only the App1 from the data broadcasting applications transmitted from the program production station, in the MH-AIT 914C. In this case, when finding the default flag from the application service descriptor 1, the receiver can boot, as a default entry, the application App1 only including an automatic boot set, from the App1, the App2, and the App4 to be controlled in the MH-AIT 914C, distributed from the program production station.

That is, as described above with reference to FIG. 9, the application service descriptor associated with each delivery segment, such as the key station being the program production station, each local station being the distribution station, and the third party, is arranged in the MP table so that the data broadcasting application and the control information relating to the application for each delivery segment, with respect to the same broadcast program, can be transmitted through the independent channel (the delivery path). Therefore, the management of the application can be independently achieved for each delivery segment that provides the data broadcasting application. The details of syntax of the application service descriptor, will be described later.

Figure 10:
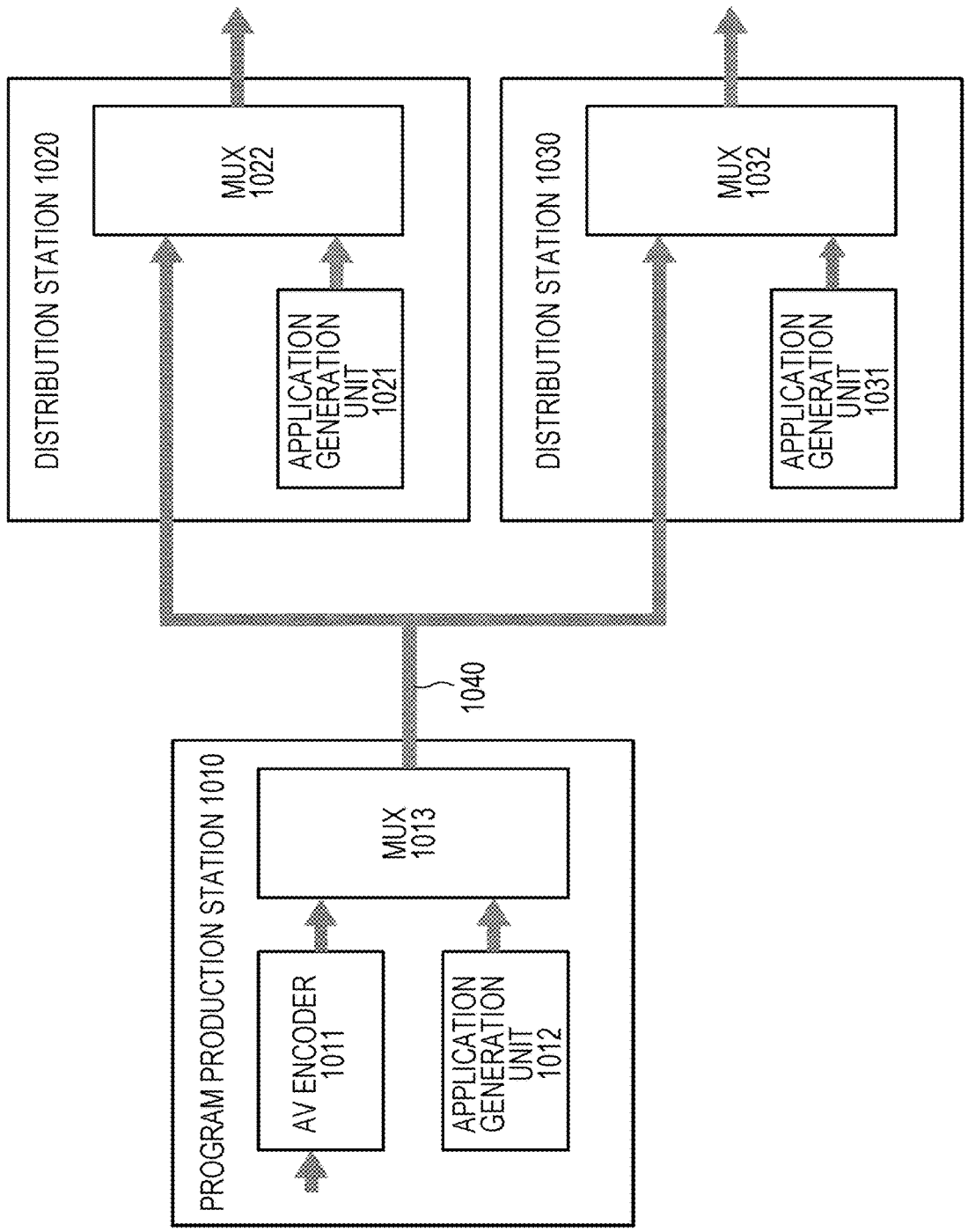
FIG. 10 is a schematic block diagram of a mechanism for transmitting a data broadcasting application and control information relating to the application for each delivery segment, with respect to the same broadcast program, through an independent channel.

FIG. 10 schematically illustrates a mechanism for transmitting the data broadcasting application and the control information relating to the application for each delivery segment, with respect to the same broadcast program, through the independent channel (the delivery path). Note that, a program production station and two distribution stations 1020 and 1030 are estimated to be delivery segments in FIG. 10.

An AV encoder 1011 including a video encoder and an audio encoder, encodes data, such as video and audio, included in a broadcast program body, in the program production station 1010. In addition, an application generation unit 1012 generates, for example, a data broadcasting application linked with a broadcast program, as well as control information relating to the application. A multiplexer (MUX) 1013 multiplexes the data of the broadcast program that has been encoded, and data including the data broadcasting application and the control information thereon.

The program production station 1010 arranges a new descriptor being an application service descriptor in association with each delivery segment including the program production station 1010, in an MP table including control information on a broadcast service level, described therein, in producing and encoding the control information relating to the application. Then, location information on control data necessary or important for managing the data broadcasting application for each delivery segment is indicated in the application service descriptors. The control data necessary or important for managing the application, referred to here, includes a data transmission message, an MH-AIT, and an EMT.

Then, the program production station 1010 distributes a multiplexed distribution signal into the individual distribution stations 1020 and 1030 through a communication transmission line 1040, such as B2B.

An application generation unit 1021 generates a data broadcasting application not liked with the broadcast program as well as control information relating to the application, in the distribution station 1020. The program-non-linked data broadcasting application is an application for providing information closely related to a region, such as weather forecasting or local news. A multiplexer 1022 multiplexes the distribution signal distributed from the program production station 1010, and the data broadcasting application and the control information thereon.

The distribution station 1020 stores control data necessary or important for managing its own application in accordance with the location information specified with the application service descriptor arranged in association with the distribution station 1020 in the MP table, described by the program production station 1010, in generating and encoding the control information relating to its own application in the distribution station 1020. Then, the distribution station 1020 transmits a multiplexed distribution signal as a broadcast wave.

Similarly, an application generation unit 1031 generates, for example, a data broadcasting application not linked with the broadcast program as well as control information relating to the application, in the distribution station 1030. A multiplexer 1032 multiplexes the distribution signal distributed from the program production station 1010, and the data broadcasting application and the control information thereon.

The distribution station 1030 stores control data necessary or important for managing its own application in accordance with the location information specified with the application service descriptor arranged in association with the distribution station 1030 in the MP table, described by the program production station 1010, in generating and encoding the control information relating to its own application. Then, the distribution station 1030 transmits a multiplexed distribution signal as a broadcast wave.

The application service descriptors associated with the individual delivery segments are arranged in the MP table stored in a PA message being an entry point of MMT-SI, in order for the plurality of delivery segments (the program production station 1010, the distribution station 1020, and the distribution station 1030) to achieve the independent management of the data broadcasting application, as illustrated in FIG. 10, in the technology disclosed in the present specification.

Figure 11:
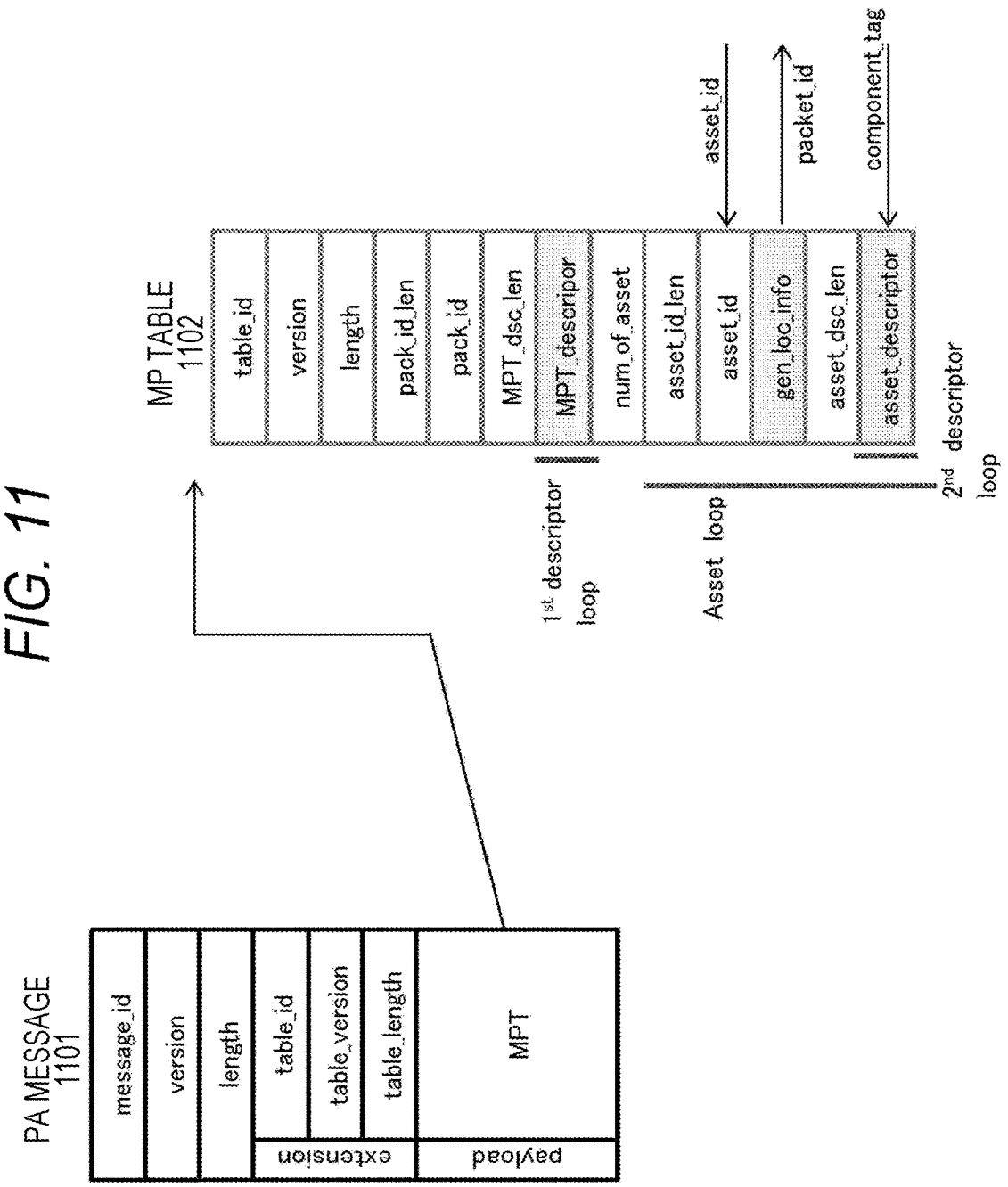
FIG. 11 is a block diagram of an exemplary configuration of a PA message 1101 and an MP table 1102 included in the PA message.
Figure 12:
FIG. 12 is a table of a syntax example 1200 of the PA message.

FIG. 11 illustrates an exemplary configuration of a PA message 1101 being one of signaling messages and an MP table 1102 included in the PA message. In addition, FIG. 12 illustrates a syntax example 1200 of the PA message. Each parameter of the PA message will be described below.

message_id is a 16-bit fixed value for identifying the PA message in various types of signaling information. Version is a parameter of an 8-bit integer value, indicating a version of the PA message. For example, when a part of the parameters included in the PA message is updated, the version is incremented by +1. length is a parameter, having a 32-bit length, to be counted immediately after the field thereof, the parameter indicating the size of the PA message in bytes.

Attribute information on tables arranged in a field of a payload (message_payload), is arranged in an extension field. Specifically, a number_of_table field indicates the number of the tables stored in the PA message, and 8-bit table identification information (table_id), 8-bit table version (table_version), and 16-bit table length (table_length) are arranged, as the attribute information on each table stored, in the following loop of index information on the tables. The table_id is a fixed value for identifying the tables. The table_version indicates versions of the tables. The table_length indicates sizes of the tables in bytes.

The tables in quantity of the number indicated with the number_of_tables are arranged in the message_payload field of the PA message. The MP table stored in the field indicates information relating to a package including a list of all assets. Note that, a layoput configuration (LC) table and a package list (PL) table other than the MP table, are also stored in the PA message, but the tables do not directly relate to the technology disclosed in the present specification, and thus the detailed descriptions thereof will be omitted.

FIG. 13 illustrates a syntax example 1300 of the MP table stored in the PA message. Each parameter of the MP table will be described below.

table_id is an 8-bit fixed value (0x20) for identifying that the table is the MP table. version is an 8-bit integer value indicating the version of the MP table. For example, when a part of parameters included in the MP table is updated, the version is incremented by +1. length is a parameter, having a 32-bit length, to be counted immediately after the field thereof, the parameter indicating the size of the MP table in bytes. In addition, MPT_mode indicates an operation when the MP table is divided into subsets, but the detailed descriptions thereof will be omitted.

MMT_package_id_length indicates the size of text information of package identification information (MMT_package_id), in bytes. The package identification information, the MMT_package_id, is indicated in bytes (MMT_package_id byte) in the following loop of the package identification information. The package identification information is identification information on the entire package including components being assets, such as all signals (video, audio, and subtitles) as well as file data (a data broadcasting application) transmitted with a broadcast signal (an IP data flow). The identification information is text information, and higher-order 16 bits are made to be a value the same as that of service identification information for identifying a service.

MPT_descriptor_length indicates the size of an MP table descriptor area in bytes. The following loop of an MP table descriptor indicated with reference numeral 1301, describes a content of the MP table descriptor in bytes (MPT_descriptors_byte). According to the present embodiment, an application service descriptor is arranged, as one MP table descriptor, for each delivery segment. Each application service descriptor indicates location information on each piece of the control data necessary or important for managing the data broadcasting application provided by the corresponding delivery segment. The details of syntax of the application service descriptor, will be described later.

number_of_assets is an 8-bit parameter indicating the number of the assets (signals and files) being the components included in the package. Loops of asset information are arranged in quantity of the number indicated with the number_of_asset. Individual parameters of asset identification information (asset_id) being individual asset information, general location information (MMT_general_location_ info), and an asset descriptor (asset_descriptor) are arranged in one loop of the asset information. The information arranged in the loop of the asset information, will be described below.

identifier_type indicates an ID system of an MMTP packet flow. The ID system indicating the asset identification information (asset_id) is defined to be 0x00.asset_id_scheme indicates a format of the asset identification information. asset_id_length indicates the size of text information on the asset identification information, in bytes. The asset identification information is indicated in bytes (asset_id_byte) in the following loop of the asset identification information.

asset_type indicates the types of the assets with a character string having a 32-bit length. asset_clock_relation _flag is a flag indicating whether an asset clock information field is present. A clock information identification field (asset_clock_relation_id) and a timescale flag field (asset_timescale_flag) are present when the flag is 1, and the fields are not present when the flag is 0. location_count indicates the location information count of the assets, and the following loop of the location information repeated by the location_count, indicates MMT_general_location_info being the location information on the corresponding asset. The location information of the asset is described in a format of packet identification information (packet_id: PID) on the IP data flow being an acquisition destination. Therefore, the asset identification information is drawn on the MP table so that the corresponding packet identification information on the IP data flow can be extracted. A data structure of the MMT_general_location_info will be described later.

asset_descriptor_length indicates the size of text information on an asset descriptor (asset_descriptor), in bytes. The following loop of the asset descriptor indicates a content of the descriptor for each asset, in bytes (asset_descriptors_ byte).

FIG. 14 illustrates a syntax example 1400 of the application service descriptor arranged for each delivery segment in the MP table. Each parameter of the application service descriptor will be described below.

descriptor_tag (a descriptor tag) identifies the type of the descriptor in an 8-bit field. descriptors_length is an area in which a data byte count following this field is written.

application_type indicated with reference numeral 1401 indicates a format of an application to be controlled of the application service descriptor (in other words, to be transmitted from the corresponding delivery segment). Table 1 below illustrates exemplary allocation of application types. In addition, application_priority indicated with reference numeral 1402 indicates priority for each application type (priority for booting an application with the application types transmitted from the corresponding delivery segment).

TABLE 1

| APPLICATION FORMAT | DESCRIPTION |
| --- | --- |
| 0x0000 | reserved_future_use |
| 0x0001 | ARIB-J APPLICATION |
| 0x0002~0x000F | reserved_future_use |
| 0x0010 | BROADCAST COMMUNICATION COOPERATIVE HTML5 APPLICATION |
| 0x0011 | ARIB-J-HTML5 APPLICATION |
| 0x0012~0x7FFF | reserved_future_use | default_AIT_flag is a flag indicating whether MH-AIT transmitted from the corresponding delivery segment is an AIT to be monitored of a default.

DT_message_flag is a flag indicating whether a data transmission message is transmitted, as control information on the data broadcasting application, from the corresponding delivery segment. In addition, EMT_num indicates an EMT distribution count from the corresponding delivery segment. When the delivery segment distributes the data broadcasting application only through an IP network (when the data broadcasting application is not distributed through the broadcast signal), the data transmission message and the EMT are not distributed.

AIT_location_info indicates location information on an MIT-AIT being one of signaling tables transmitted with M2 section messages, in accordance with the syntax of MMT_general_location_info (general location information). location_type of the MMT_general_location_info is "0×00" when the MH-AIT is transmitted through the broadcast signal, and the location type is "0×05" when the MH-AIT is transmitted through the communication. The details of the MMT_general_location_info will be described later.

In addition, when DT_message_flag is 1, location information DT_message_location_info of the data transmission message is indicated in accordance with the syntax of the MMT_general_location_info. The data transmission message is transmitted only through the broadcast signal so that the location_type of the MMT _general_location_info is basically "0×00".

In addition, loops in quantity of the number indicated with the EMT_num, individually indicate location information EMT_location_info of each EMT, in accordance with the syntax of the MMT_general_location_info. Such an EMT is transmitted only through the broadcast signal so that the location_type of the MMT_general_location_info is basically "0×00".

FIG. 15 illustrates a syntax example 1500 of the MMT_general_location_info (general location information) indicating the location information of an asset. Each parameter of the MMT_general_location_info will be described below.

location_type indicates the type of the location information in 8 bits, and complies with allocation in Table 2 below.

TABLE 2

| VALUE | MEANING OF LOCATION TYPE |
|---|---|
| 0x00 | INDICATE MMTP PACKET OF IP DATA FLOW SAME AS IP DATA FLOW THROUGH WHICH TABLE INCLUDING general_location_info IS TRANSMITTED. |
| 0x01 | INDICATE MMTP PACKET OF IPv4 DATA FLOW. |
| 0x02 | INDICATE MMTP PACKET OF IPv6 DATA FLOW. |
| 0x03 | INDICATE MPEG-2 TS PACKET OF BROADCAST NETWORK OF MPEG-2 TS. |
| 0x04 | INDICATE MPEG-2 TS PACKET OF IPv6 DATA FLOW. |
| 0x05 | INDICATE URL. |

When the location_type is 0×00, packet identification information (packet_id) on an MMTP packet of an IP data flow the same as an IP data flow through which a table including the location information is transmitted, is indicated.

When the location_type is 0×01, an MMTP packet of an IPv4 data flow is indicated as location information. Specifically, a transmission source address (ipv4_src_addr) of the IPv4 data flow, a destination address (ipv4_dst_addr) of the IPv4 data flow, a destination port number (dst_port) of the IP data flow, and the packet identification information (packet_id) are indicated.

When the location type is 0×02, an MMTP packet of an IPv6 data flow is indicated as the location information. Specifically, a transmission source address (ipv6_src_addr) of the IPv6 data flow, a destination address (ipv6_dst_addr) of the IPv6 data flow, the destination port number (dst_port) of the IP data flow, and the packet identification information (packet_id) are indicated.

When the location type is 0×03, an MPEG-2 TS packet of a broadcast network of an MPEG-2 TS is indicated as the location information. Specifically, network identification information (network_id) for identifying the broadcast network, transport stream identification information (MPEG_2_transport_stream_id) for identifying the MPEG-2 TS, and packet identification information (MPEG_2_PID) of the MPEG-2 TS packet are indicated.

When the location_type is 0×04, an MPEG-2 TS packet of the IPv6 data flow is indicated as the location information. Specifically, the transmission source address (ipv6_src_addr) of the IPv6 data flow, the destination address (ipv6_dst_addr) of the IPv6 data flow, the destination port number (dst_port) of the IP data flow, and the packet identification information (MPEG_2_PID) of the MPEG-2 TS packet are indicated.

When the location_type is 0×05, the location information is indicated with an URL. Specifically, URL_length indicates the length of an URL byte field, in bytes, and the following loop of the URL byte indicates an URL character string in bytes (URL_byte).

FIG. 16 illustrates a syntax example 1600 of an MH AIT being one of the signaling tables transmitted with the M2 section messages. As described above, AIT_location_info in the application service descriptor arranged for each delivery segment in the MP table, indicates the location information on the MIT-AIT transmitted from the corresponding delivery segment, in accordance with the syntax of the general location information (refer to FIG. 15). Meanings of individual parameters of the MH AI table will be described below.

table_id (table identification) is an 8-bit fixed value for identifying an application information (AI) table in various types of signaling information, and is 0×89 according to the present embodiment. section_syntax_indicator (a section syntax indicator) is constantly "1" in a 1-bit field. sectoin_length (a section length) prescribes the byte length of a section from a section length field to the end of the section including CRC 32, in a 12-bit field. The value is made not to exceed 4093 (0xEFD in a hexadecimal number system).

application_type (an application type) indicates a format of an application to be controlled of the MH-AIT (in other words, to be transmitted from the corresponding delivery segment), in a 16-bit field. Allocation of the application type complies with Table 1 above, similarly to the application service descriptor.

version_number (a version number) is the version number of a sub-table in a 5-bit field. The version_number is the version number of the MH AI table, and is incremented by +1 when information in the sub-table varies. In addition, when becoming "31", the value of the version number goes back to "0"next. current_next_indicator (an current next indicator) is constantly "1". section_number (a section number) indicates a section number in an 8-bit field. The section number of a first section is 0×00 in the sub-table. The section number is incremented by +1 every time a section having the same table identification and application type, is added. last_section_number (a last section number) prescribes a last section number in the sub-table to which the section belongs, in an 8-bit field.

common_descriptor_length (a common descriptor loop length) indicates the byte length of the following descriptor (a descriptor in a description area) in an 8-bit field, and the descriptor (the descriptor in the description area) is written in a series of areas including loops in quantity of the byte length. The descriptor in a common descriptor area is applied to all applications in the AIT sub-table.

application_loop_length is an area in which an application information count included in the MH AI table is written.

Then, loops of the application information are arranged in quantity of the number indicated with the application_loop_length. Then, a cyclic redundancy check CRC32 (CRC) complying with the ITU-T recommendation H.222.0, is added to the end of the table.

application_identifier (an application identifier), application_control_code (an application control code), and the application information, are arranged in one loop of the application information.

Here, the application_identifier (the application identifier) is a parameter for identifying an application. The application_control_code (the application control code) prescribes a control code for controlling a state of the application, in an 8-bit field. Semantics of the field is dependent on a value of an application type. Table 3 illustrates semantics of an application control code independent of the application type. An application control code 0×01 specifies an automatic boot (AUTOSTART) of the application.

TABLE 3

| APPLICATION CONTROL CODE VALUE | IDENTI- FICATION NAME | MEANING |
| --- | --- | --- |
| 0x01 | AUTOSTART | BOOT APPLICATION. |
| 0x02 | PRESENT | INDICATE STATE WHERE APPLICATION IS OPERABLE. |
| 0x04 | KILL | FINISH APPLICATION. |
| 0x05 | PREFETCH | ACQUIRE AND RETAIN APPLICATION. | application_descriptor_loop_length (an application information descriptor loop length) indicates the byte length of an application information descriptor, and the descriptor (the application information descriptor) is written in a series of areas including loops in quantity of the byte length. The application information descriptor in a descriptor area is different from a common descriptor, and is applied to only an application specified with the application_identifier.

FIG. 17 illustrates a different syntax example 1700 of the application service descriptor arranged for each delivery segment in the MP table. application_type_indicating an application type is arranged as indicated with reference numeral 1701, but the syntax example 1700 is different from the syntax example 1400 of the application service descriptor illustrated in FIG. 14 in terms of two points including no arrangement of an application_priority field indicating the priority for each application type and an arrangement of a private data area private_data at the end of the descriptor as indicated with reference numeral 1702. The meaning of the application_type indicated with reference numeral 1701 is similar to that in the syntax example 1400 illustrated in FIG. 14.

The private data area can flexibly define information necessary for managing a data broadcast service. A utilization method of storing priority information for each application type into the private data area, can be considered.

FIG. 18 illustrates a syntax example 1800 of the private data area. data_segment_tag_identifies the type of the private data area (16 types at a maximum) in a 4-bit field. data_length is an area in which a data byte count (16 bytes at a maximum) of an area (data_segment) following this field is written. data_segment stores a content of private data.

In addition, FIG. 19 illustrates an exemplary use of the private data area. Here, the utilization method of storing the priority information for each application type, is estimated. data_segment_tag is "1" so as to identify that the private data area is used for the priority information for each application type, in the example of the figure. In addition, the data length (data_length) of data_segment is made to be 1 byte, and the data_segment indicates the priority for each application type with an 8-bit value.

FIG. 20 illustrates another different syntax example 2000 of the application service descriptor arranged for each delivery segment in the MP table. The application type and the priority for each application type have been indicated with the individual parameters (the application_type and the application_priority) in the syntax example 1400 of the application service descriptor illustrated in FIG. 14. In contrast to this, the syntax example 20 illustrated in FIG. 20 is different from the syntax example 1400 in that two parameters being application_type and application_priority are not arranged and, instead, an 8-bit single parameter being application_bitmap indicates both of the application type and the priority for each application type as indicated with reference numeral 2001. In addition, a private data area private_data is arranged at the end of the descriptor as indicated with reference numeral 2002, similarly to the syntax example 1700 illustrated in FIG. 17. The private data area can flexibly define information necessary for managing the data broadcast service (as described above).

An exemplary method of managing the application_bitmap will be described. The application_bitmap expresses an application type to be controlled of the application service descriptor (in other words, to be transmitted from the corresponding delivery segment) in 2 bits. Table 4 exemplifies classifications of application types expressed in 2 bits.

TABLE 4

| VALUE | MEANING |
| --- | --- |
| 01 | APPLICATION SYSTEM 1 (HTML5) |
| 10 | APPLICATION SYSTEM 2 (java). |
| 11 | APPLICATION SYSTEM 3 |

Figure 21:
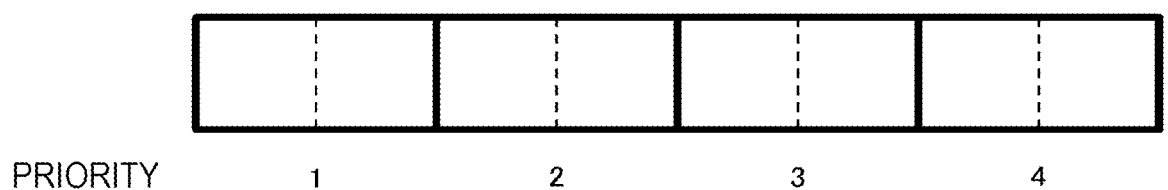
FIG. 21 is a diagram for describing a method of indicating priority of an application type with application_bitmap.
Figure 22:
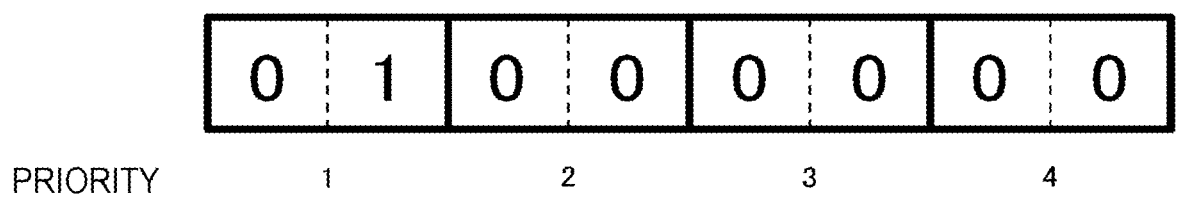
FIG. 22 is another diagram for describing the method of indicating the priority of the application type with the application_bitmap.

In addition, the priority is indicated on the basis of a position at which a 2-bit value indicating each of the application types is stored in the 8 bits of the application_bitmap. FIG. 21 illustrates an exemplary method of indicating the priority of an application type with the 8-bit application_bitmap. The 8 bits are segmented into blocks each including 2 bits, and priority 1, priority 2, priority 3, and priority 4 are allocated to the individual blocks in sequence from the side of the MSB in the example of the figure. Then, a 2-bit value for identifying an application type is stored in a block corresponding to the priority given to the application type, and all the other bits are set to be "0". For example, as illustrated in FIG. 22, an application system 1 identified with "01" is stored on the side of the MSB so that the application type (HTML5) has highest priority.

Note that, the method of managing the application_bitmap can identify only three types of the application types in 2 bits. This is because, when an application type is allocated to "00", all the 8 bits of the application_bitmap are made to be "0" so as to be similar to empty information. When a fourth application type appears, the application_bitmap all is made to be 0 so that the application type and the priority for each application type may be indicated with a private data area.

As described above, according to the technology disclosed in the present specification, the new descriptor being the application service descriptor is arranged for each delivery segment providing a data broadcasting application, in the MP table including the control information on the broadcast service level, described therein. The syntax examples of the application service descriptor have been illustrated in FIGS. 14, 17, and 20. The syntax of the application service descriptor includes no information for identifying a delivery segment directly.

In addition, only information on one application type is prescribed to be described in one application service descriptor. The method of expressing the application type in each syntax example, has already been described.

In addition, data broadcasting applications of a plurality of application types are estimated to be provided from delivery segments, and the priority for each application type (application_priority) is prescribed to be indicated in an application service descriptor in order to specify which application is booted in priority. The method of expressing the priority of the application types in each syntax example has already been described with reference to FIG. 14, 17, or 20.

Therefore, when a broadcast signal similar to that illustrated in FIG. 9 is received on the side of the receiver, a specific application information table (MH-AIT) and data transmission message can be further selected with the flag indicating the AIT to be monitored of the default after determination of the priority for each application type indicated with each of a plurality of the application service descriptors arranged in the MP table.

Figure 23:
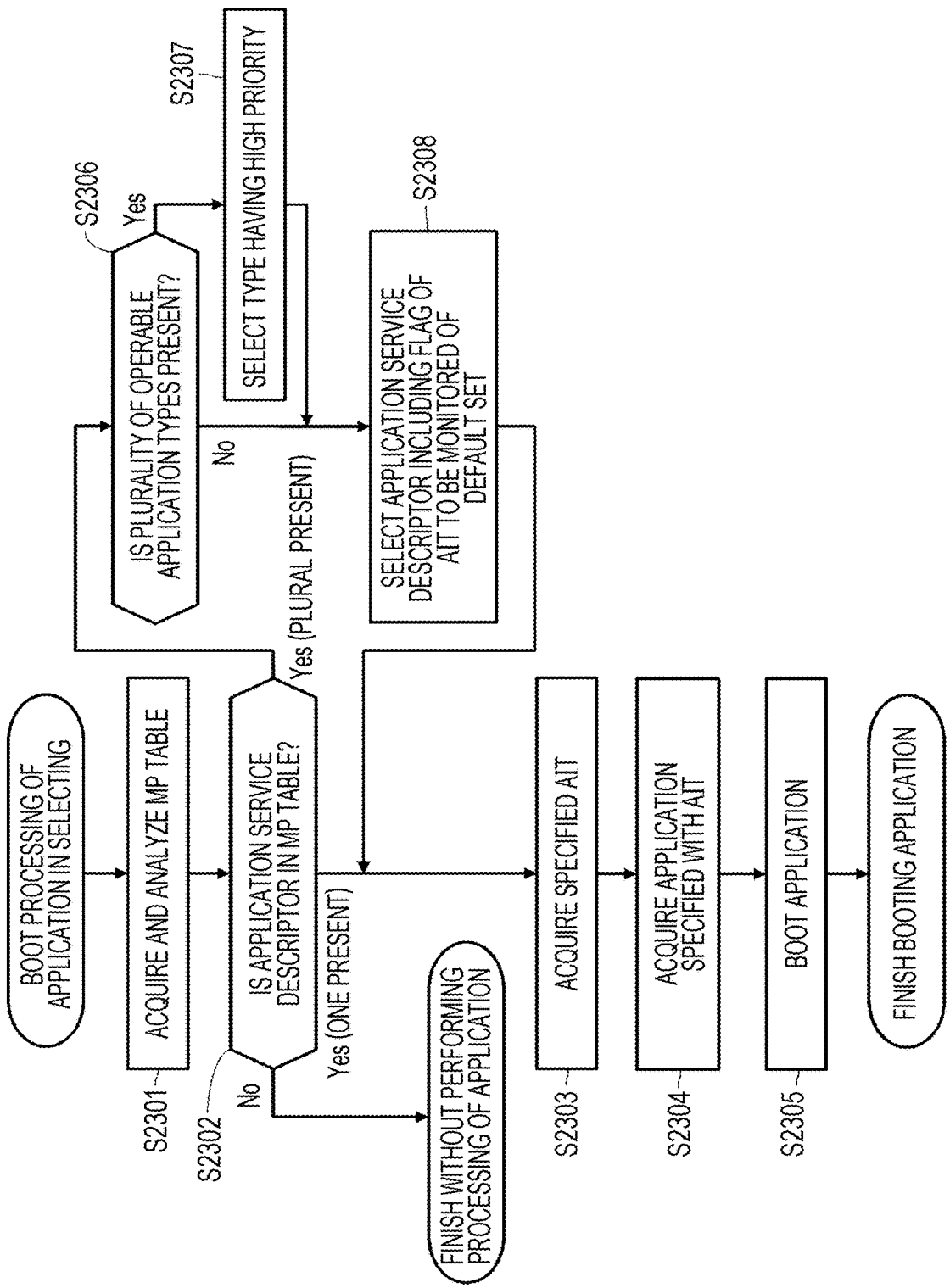
FIG. 23 is a flowchart of a procedure of booting a data broadcasting application in a receiver.

FIG. 23 illustrates a procedure for booting a data broadcasting application in the receiver, in a flow chart format. Note that, the receiver is estimated to receive a broadcast signal similar to that illustrated in FIG. 9. In addition, it is to be understood that the procedure illustrated in FIG. 23 corresponds to any of FIGS. 14, 17, and 20, in terms of the syntax of an application service descriptor arranged in an MP table. In addition, the procedure boots when the receiver performs a selection operation, and is mainly performed by the application control unit 408 in the receiver.

When receiving the broadcast signal, the receiver acquires the MP table transmitted with a PA message being an entry point of a broadcast service, so as to analyze a content thereof (step S2301).

Here, the receiver checks whether the application service descriptor is arranged in the MP table (step S2302).

Here, when no application service descriptor is arranged in the MP table, the present processing routine is completed without performing boot processing of the data broadcasting application.

In addition, when a plurality of the application service descriptors is arranged in the MP table, a content of each application service descriptor is checked and then whether a plurality of the application service descriptors indicating an operable application type with the receiver, is present, is checked (step S2306).

When a plurality of the application types operable is present (Yes at step S2306), the receiver selects the application service descriptor of an application type having high priority (step S2307). Then, the receiver selects an application service descriptor including the flag of the AIT to be monitored of the default set therein, in the selected application service descriptors (step S2308).

In addition, when only one application service descriptor indicating an application type operable is present (No at step S2306), the receiver selects an application service descriptor including the flag of the AIT to be monitored of the default set therein, in the application service descriptors indicating the application type operable (step S2308).

At step S2303, the receiver acquires an MH-AIT specified with the application service descriptor. Specifically, when only one application service descriptor is arranged in the MP table, an MH-AIT including location information specified with the application service descriptor, is acquired. In addition, when a plurality of the application service descriptors is arranged in the MP table, an MH-AIT including location information specified with the application service descriptor, selected at step S2308, including the flag of the AIT to be monitored of the default set therein, is acquired.

Next, the receiver acquires a data broadcasting application specified with the MH-AIT (step S2304). Refer to Japanese Patent Application No. 2014-250279 that has already been ceded to the present applicant, for the details of a method of acquiring a data file of the data broadcasting application specified with the MH-AIT.

Then, the receiver boots the data broadcasting application that has been acquired, using the application engine 409 (step S2305).

Figure 24:
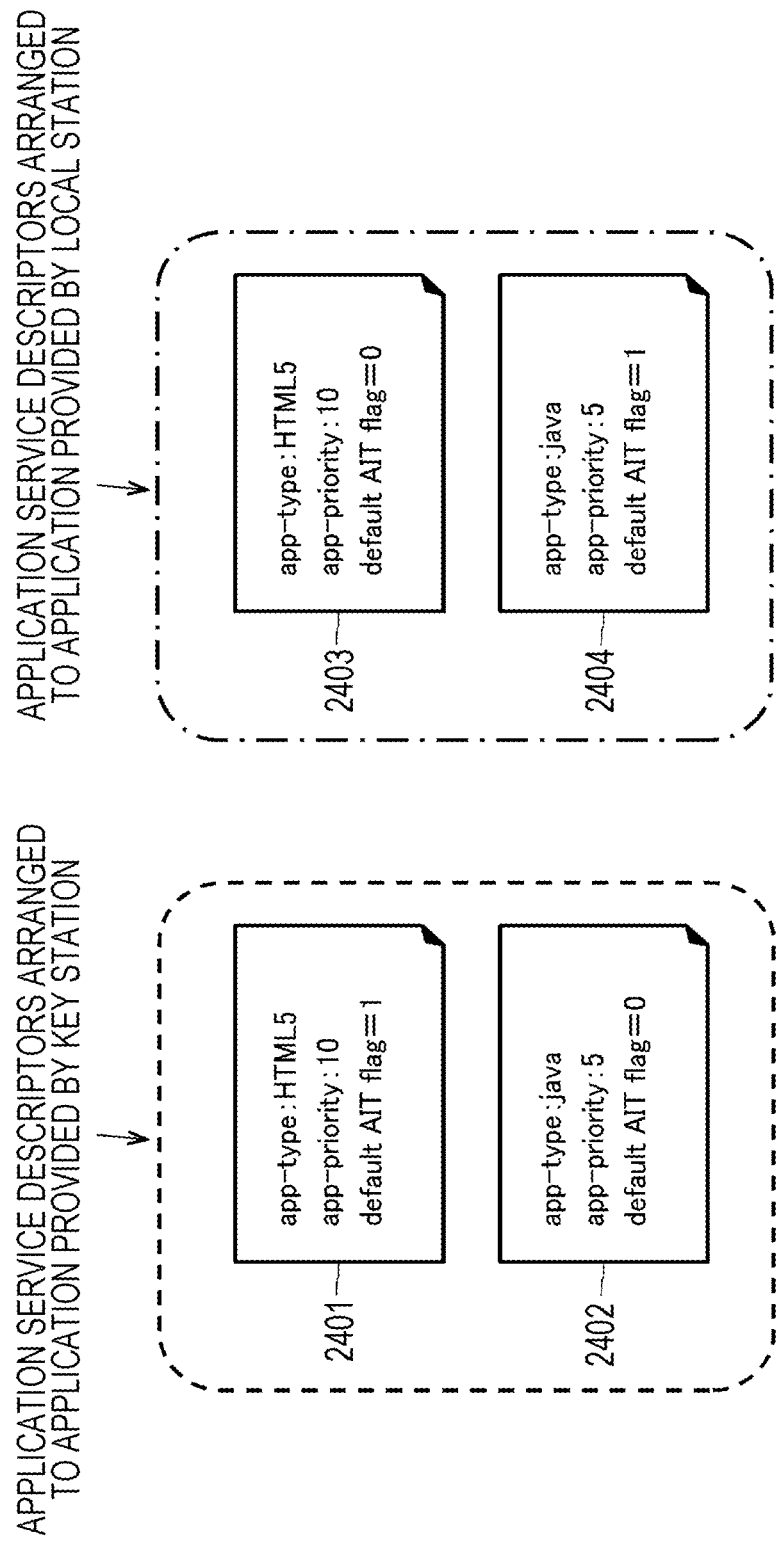
FIG. 24 is a diagram of an example in which an application service descriptor has specified an application type and priority.

A processing operation with which the receiver determines the priority of applications and the AIT to be monitored of the default in accordance with the procedure illustrated in FIG. 23, will be described in an exemplary case where four application service descriptors 2401 to 2404 illustrated in FIG. 24 are arranged in the MP table.

Reference numerals 2401 and 2402 are application service descriptors arranged corresponding to a key station that has produced a program. Note that, the individual application service descriptors 2401 and 2402 include no information for identifying the key station being a delivery segment. The one application service descriptor 2401 indicates information on a data broadcasting application having an application type in the HTML5 format and the priority of the application type, provided by the key station. The priority in the HTML5 format and the flag of the AIT to be monitored of the default, provided by the key station, are specified as "10" and "1", respectively, in the application service descriptor 2401. The other application service descriptor 2402 indicates information on a data broadcasting application having an application type in the java format and the priority of the application type, provided by the key station. The priority in the java format and the flag of the AIT to be monitored of the default, provided by the key station, are specified as "5" and "0", respectively, in the application service descriptor 2402.

Reference numerals 2403 and 2404 are application service descriptors arranged corresponding to a local station. Note that, the individual application service descriptors 2403 and 2404 include no information for identifying the local station being a delivery segment. The one application service descriptor 2403 indicates information on a data broadcasting application having an application type in the HTML5 format and the priority of the application type, provided by the local station. The priority in the HTML5 format and the flag of the AIT to be monitored of the default, provided by the local station, are specified as "10" and "0", respectively, in the application service descriptor 2403. The other application service descriptor 2404 indicates information on a data broadcasting application having an application type in the java format and the priority of the application type, provided by the key station. The priority in the java format and the flag of the AIT to be monitored of the default, provided by the key station, are specified as "5" and "1", respectively, in the application service descriptor 2404.

When the receiver receives the broadcast signal including a plurality of the application service descriptors 2401 to 2404 illustrated in FIG. 24 arranged in the MP table, the processing proceeds to step S2306 through a branch at step S2302 so that whether a plurality of application service descriptors indicating an operable application type is present, is checked.

For example, when both of the application types in the HTML5 format and the java format are operable with the receiver, the processing proceeds to step S2307, and then the application service descriptors 2401 and 2403 specifying the application type in the HTML5 format specified with "10" being high priority, are selected from the application service descriptors 2401 to 2404. Then, the receiver selects the application service descriptor 2401 including the flag of the AIT to be monitored of the default set therein, at step S2308.

In addition, when only the application type of the HTML5 is operable with the receiver, the processing proceeds to step S2308, and then the receiver selects the application service descriptor 2401 including the flag of the AIT to be monitored of the default set therein, from the application service descriptors 2401 and 2403 specifying the application type in the HTML5 format.

In this manner, after determining the priority for each application type indicated with the application service descriptors arranged in the MP table in accordance with the procedure illustrated in FIG. 23, the receiver can further select a specific MH-AIT and data transmission message on the basis of the flag indicating the AIT to be monitored of the default.

INDUSTRIAL APPLICABILITY

The technology disclosed in the present specification has been described in detail above with reference to the specific embodiment. However, needless to say, modifications and replacements for the embodiment may be made by a person skilled in the art without departing from the scope of the spirit of the technology disclosed in the present specification.

The technology disclosed in the present specification can be applied to various transmission systems adopting the MMT as a transport system. In addition, the technology disclosed in the present specification can be applied to a broadcast system estimated to include a plurality of delivery segments for data broadcast applications present.

That is, the technology disclosed in the present specification has been described in a mode including the exemplifications, and thus the descriptions of the present specification should not be interpreted restrictively. The scope of the claims should be considered in order to understand the spirit of the technology disclosed in the present specification.

Note that, the technology disclosed in the present specification can have the following configurations.

(1) A transmission device includes: an application transmission unit configured to transmit an application with respect to a broadcast program; and a signaling message transmission unit configured to transmit a signaling message relating to the application. The signaling message transmission unit arranges an application service descriptor for each delivery segment providing the application, into a signaling table transmitted with a predetermined signaling message, so as to transmit the application service descriptor.

(2) In the transmission device described in (1) above, the signaling message transmission unit indicates, in each application service descriptor, location information on the signaling message or the signaling table storing control data necessary or important for managing the application provided by a corresponding delivery segment.

(3) In the transmission device described in (1) above, the signaling message transmission unit indicates, in each application service descriptor, location information on a data transmission message, an application information table, or an event message table, transmitted by a corresponding delivery segment.

(4) In the transmission device described in (1) above, the signaling message transmission unit arranges the application service descriptor for each delivery segment, into the signaling table transmitted with the signaling message being an entry point of a broadcast service, so as to transmit the application service descriptor.

(5) In the transmission device described in (1) above, the signaling message transmission unit indicates information on application types provided by the delivery segments in each application service descriptor.

(6) In the transmission device described in (5) above, the signaling message transmission unit further indicates information on priority for each application type in each application service descriptor.

(7) In the transmission device described in (6) above, the signaling message transmission unit includes a parameter indicating information on the priority for each application type (application_priority), into each application service descriptor.

(8) In the transmission device described in (6) above, the signaling message transmission unit indicates information on the priority for each application type, in a private data area arranged in each application service descriptor.

(9) In the transmission device described in (6) above, the signaling message transmission unit indicates an application type and priority of the application type in a bitmap information area (application_bitmap) having a predetermined bit length.

(10) In the transmission device described in (9) above, the signaling message transmission unit indicates the priority of the application type, with a position at which n-bit information indicating the application type is stored in the bitmap information area having an m-bit length, the n being smaller than the m.

(11) In the transmission device described in (1) above, the signaling message transmission unit indicates, in each application service descriptor, whether an application information table for a corresponding delivery segment is specified as an object to be monitored of a default.

(12) In the transmission device described in (1) above, the signaling message transmission unit indicates, in each application service descriptor, information on an event message table count transmitted from a corresponding delivery segment.

(13) In the transmission device described in (1) above, the application transmission unit transmits the application with a first transmission packet including first payload classification information indicating that the application is included in a payload, inserted into a packet header, and the signaling message transmission unit transmits the signaling message with a second transmission packet including second payload identification information indicating that the signaling message is included in the payload, inserted into the packet header.

(14) A transmission method includes: an application transmission step of transmitting an application with respect to a broadcast program; and a signaling message transmission step of transmitting a signaling message relating to the application. The signaling message transmission step arranges an application service descriptor for each delivery segment providing the application, into a signaling table transmitted with a predetermined signaling message, so as to transmit the application service descriptor.

(15) A reception device includes: an application reception unit configured to receive an application with respect to a broadcast program; and a signaling message reception unit configured to receive a signaling message relating to the application. The signaling message reception unit receives a predetermine signaling message storing a signaling table including an application service descriptor for each delivery segment providing the application, arranged into the signaling table to be transmitted.

(16) The reception device described in (15) above, further includes: an application control unit configured to control a boot for the application received by the application reception unit. The application control unit selects the signaling message or the signaling table received with the signaling message, on the basis of priority for each application type with each application service descriptor arranged in the signaling table.

(17) A reception method includes: an application reception step of receiving an application with respect to a broadcast program; and a signaling message reception step of receiving a signaling message relating to the application. The signaling message reception step receives a predetermined signaling message storing a signaling table including an application service descriptor for each delivery segment providing the application, arranged into the signaling table to be transmitted.

REFERENCE SIGNS LIST

10 Digital broadcasting system
11 Broadcast transmission system
12 Receiver
301 Clock unit
302 Signal transmission unit
303 Video encoder
304 Audio encoder
305 Caption encoder
306 Signaling encoder
307 File encoder
308 EDPS
309 TLV signaling encoder
310 IP service multiplexer
311 TLV multiplexer
312 Modulation transmission unit
401 Tuner demodulator
402 Demultiplexer
402-1 TLV filter
402-2 IP filter
402-3 UDP filter
402-4 MMT filter
402-5 SI filter
403 Clock restoration unit
404 Video decoder
405 Audio decoder
406 Caption decoder
407 System control unit
408 Application control unit
409 Data broadcasting application engine
410 IP interface
411 Synthesis unit
1010 Program production station
1011 AV encoder
1012 Application generation unit
1013 Multiplexer
1020 Distribution station
1021 Application generation unit
1022 Multiplexer
1030 Distribution station
1031 Application generation unit
1032 Multiplexer
1040 Communication transmission line

The invention claimed is:

1. A transmission device, comprising:
processing circuitry configured to:
transmit a first application with respect to a broadcast program via a first delivery segment that is managed by the transmission device;
transmit a first signaling message via the first delivery segment, the first signaling message including information regarding acquiring the first application;
arrange at least a first piece and a second piece of application information into a signaling table, the first piece of application information corresponding to information for obtaining the first signaling message from the first delivery segment, and the second piece of application information corresponding to information for obtaining a second signaling message from a second delivery segment, wherein
the second delivery segment is managed by another device that is different from the transmission device, and
the second signaling message is transmitted by the other device via the second delivery segment and includes information regarding acquiring a second application; and
transmit the signaling table via the first delivery segment.

2. The transmission device according to claim 1, wherein the processing circuitry is configure to include, in each piece of application information in the signaling table, location information regarding a corresponding signaling message provided by a corresponding delivery segment.

3. The transmission device according to claim 1, wherein the first signaling message or the second signaling message corresponds to a data transmission message, an application information table, or an event message table.

4. The transmission device according to claim 1, wherein the processing circuitry is configured to transmit the signaling table as an entry point of a broadcast service.

5. The transmission device according to claim 1, wherein the processing circuitry is configure to include information on application properties of the first and second applications in the corresponding pieces of application information.

6. The transmission device according to claim 5, wherein the processing circuitry is further configured to include priority information of the first and second applications in the corresponding pieces of application information.

7. The transmission device according to claim 6, wherein the processing circuitry is further configured to include a corresponding parameter indicating the priority information of each application in the corresponding piece of application information.

8. The transmission device according to claim 6, wherein the processing circuitry is further configured to include the priority information of each application in a private data area arranged in the corresponding piece of application information.

9. The transmission device according to claim 5, wherein the processing circuitry is further configured to include an application type and a priority of the application type of each application in a bitmap information area having a predetermined bit length in the corresponding pieces of application information.

10. The transmission device according to claim 9, wherein the processing circuitry is configured to indicate the priority of the application type as n-bit information, a position at which the n-bit information is stored in the bitmap information area indicating the application type, the bitmap information area having an m-bit length, and n being smaller than m.

11. The transmission device according to claim 1, wherein the processing circuitry is further configured to indicate, in each piece of application information, whether an application information table for a corresponding delivery segment is specified as an object to be monitored of a default.

12. The transmission device according to claim 1, wherein the processing circuitry is further configured to indicate, in each piece of application information, information on an event message table count transmitted from a corresponding delivery segment.

13. The transmission device according to claim 1, wherein the processing circuitry is further configured to:
transmit the first application with a first transmission packet including first payload classification information indicating that the first application is included in a payload of the first transmission packet, the first payload classification information being inserted into a packet header of the first transmission packet, and
transmit the first signaling message with a second transmission packet including second payload identification information indicating that the first signaling message is included in a payload of the second transmission packet, the second payload classification information being inserted into a packet header of the second transmission packet.

14. The transmission device according to claim 1, wherein the processing circuitry transmits the first application in an HTML format.

15. A transmission method, comprising:
transmitting a first application with respect to a broadcast program via a first delivery segment that is managed by a first device;
transmitting, by processing circuitry of the first device, a first signaling message via the first delivery segment, the first signaling message including information regarding acquiring the first application;
arranging, by the processing circuitry of the first device, at least a first piece and a second piece of application information into a signaling table, the first piece of application information corresponding to information for obtaining the first signaling message from the first delivery segment, and the second piece of application information corresponding to information for obtaining a second signaling message from a second delivery segment, wherein
the second delivery segment is managed by a second device that is different from the first device, and
the second signaling message is transmitted by the second device via the second delivery segment and includes information regarding acquiring a second application; and transmitting the signaling table via the first delivery segment.

16. A reception device, comprising:
processing circuitry configured to:
receive a signaling table via a first delivery segment, the signaling table including a first piece and a second piece of application information, the first piece of application information corresponding to information for obtaining a first signaling message from the first delivery segment, and the second piece of application information corresponding to information for obtaining a second signaling message from a second delivery segment, wherein
the first delivery segment is managed by a first device,
the first signaling message is transmitted by the first device via the first delivery segment and includes information regarding acquiring a first application with respect to a broadcast program,
the second delivery segment is managed by a second device that is different from the first device, and
the second signaling message is transmitted by the second device via the second delivery segment and includes information regarding acquiring a second application;
receive the first signaling message from the first delivery segment according to the first piece of application information; and
receive the first application that is transmitted by the first device from the first delivery segment according to the first signaling message.

17. The reception device according to claim 16, wherein the processing circuitry is further configured to:
obtain priority information of the first and second applications in the corresponding pieces of application information; and
control a boot for the first application and the second application according to the priority information of the first and second applications.

18. A reception method, comprising:
receiving a signaling table via a first delivery segment, the signaling table including a first piece and a second piece of application information, the first piece of application information corresponding to information for obtaining a first signaling message from the first delivery segment, and the second piece of application information corresponding to information for obtaining a second signaling message from a second delivery segment, wherein
the first delivery segment is managed by a first device,
the first signaling message is transmitted by the first device via the first delivery segment and includes information regarding acquiring a first application with respect to a broadcast program,
the second delivery segment is managed by a second device that is different from the first device, and
the second signaling message is transmitted by the second device via the second delivery segment and includes information regarding acquiring a second application;
receiving the first signaling message from the first delivery segment according to the first piece of application information; and
receiving the first application that is transmitted by the first device from the first delivery segment according to the first signaling message.

19. The transmission device according to claim 14, wherein the processing circuitry transmits a plurality of applications in the HTML format.

* * * * *